United States Patent
Drumm et al.

(10) Patent No.: US 10,481,735 B2
(45) Date of Patent: Nov. 19, 2019

(54) AUGMENTED OPTICAL WAVEGUIDE FOR USE IN AN OPTICAL TOUCH SENSITIVE DEVICE

(71) Applicant: Rapt IP Limited, Mriehel (MT)

(72) Inventors: Owen Drumm, Dublin (IE); Julien Piot, Rolle (CH); Robert Copperwhite, Dublin (IE)

(73) Assignee: Rapt IP Limited, Mriehel (MT)

( * ) Notice: Subject to any disclaimer, the term of this patent is extended or adjusted under 35 U.S.C. 154(b) by 17 days.

(21) Appl. No.: 15/821,572

(22) Filed: Nov. 22, 2017

(65) Prior Publication Data
US 2018/0143738 A1 May 24, 2018

Related U.S. Application Data

(63) Continuation of application No. 15/194,368, filed on Jun. 27, 2016, now Pat. No. 9,836,166, which is a
(Continued)

(51) Int. Cl.
*G06F 3/042* (2006.01)
*G06F 3/03* (2006.01)

(52) U.S. Cl.
CPC .......... *G06F 3/0421* (2013.01); *G06F 3/0308* (2013.01); *G06F 2203/04103* (2013.01);
(Continued)

(58) Field of Classification Search
CPC combination set(s) only.
See application file for complete search history.

(56) References Cited

U.S. PATENT DOCUMENTS 3,673,327 A * 6/1972 Johnson ................ G06F 3/0421
178/18.04
7,435,940 B2 10/2008 Eliasson et al.
(Continued)

FOREIGN PATENT DOCUMENTS

CN 1867881 11/2006
CN 101467121 6/2009
(Continued)

OTHER PUBLICATIONS

U.S. Office Action, U.S. Appl. No. 13/947,421, dated Dec. 9, 2015, 16 pages.
(Continued)

*Primary Examiner* — Robin J Mishler
(74) *Attorney, Agent, or Firm* — Fenwick & West LLP

(57) ABSTRACT

An optical touch-sensitive device is able to determine the locations of multiple simultaneous touch events. The optical touch-sensitive device includes multiple emitters and detectors coupled with an optical coupler assembly through a waveguide on the surface on the optical-touch sensitive device. Each emitter produces optical beams which propagate in the waveguide via total internal reflection and are received by the detectors. Touch events disturb the optical beams, and are determined based on the disturbances. The waveguide has at least one dead zone on its surface. The dead zone is formed with a cover layer having a top surface and a bottom surface where the bottom surface of the cover layer is directly coupled to the top surface of the waveguide. The cover layer preserves optical beam propagation in the waveguide and makes the dead zone insensitive to touches on the top surface of the cover layer.

40 Claims, 19 Drawing Sheets

Related U.S. Application Data continuation of application No. 13/947,421, filed on Jul. 22, 2013, now Pat. No. 9,405,382.

(60) Provisional application No. 61/701,141, filed on Sep. 14, 2012, provisional application No. 61/674,958, filed on Jul. 24, 2012.

(52) U.S. Cl.
CPC ............. *G06F 2203/04107* (2013.01); *G06F 2203/04109* (2013.01)

(56) References Cited

U.S. PATENT DOCUMENTS

| | | |
|---|---|---|
| 7,442,914 B2 | 10/2008 | Eliasson et al. |
| 7,465,914 B2 | 12/2008 | Eliasson et al. |
| 8,013,845 B2 | 9/2011 | Ostergaard et al. |
| 8,218,154 B2 | 7/2012 | Ostergaard et al. |
| 2005/0162398 A1 | 7/2005 | Eliasson et al. |
| 2006/0255248 A1 | 11/2006 | Eliasson |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2008/0007540 A1 | 1/2008 | Ostergaard |
| 2008/0007542 A1 | 1/2008 | Eliasson et al. |
| 2008/0088603 A1 | 4/2008 | Eliasson et al. |
| 2008/0189046 A1 | 8/2008 | Eliasson et al. |
| 2009/0122020 A1* | 5/2009 | Eliasson ............... G06F 3/0421 345/173 |
| 2009/0273794 A1 | 11/2009 | Ostergaard et al. |
| 2010/0193259 A1* | 8/2010 | Wassvik ............... G06F 3/0423 178/18.09 |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0175852 A1 | 7/2011 | Goertz et al. |
| 2011/0216042 A1 | 9/2011 | Wassvik et al. |
| 2011/0227874 A1 | 9/2011 | Fahraeus et al. |
| 2012/0068973 A1 | 3/2012 | Christiansson et al. |
| 2012/0153134 A1 | 6/2012 | Bergstrom et al. |
| 2012/0154338 A1 | 6/2012 | Bergstrom et al. |
| 2012/0162142 A1 | 6/2012 | Christiansson et al. |
| 2012/0162144 A1 | 6/2012 | Fahraeus et al. |
| 2012/0169672 A1* | 7/2012 | Christiansson ....... G06F 3/0421 345/175 |
| 2012/0200538 A1 | 8/2012 | Christiansson et al. |
| 2012/0212441 A1 | 8/2012 | Christiansson et al. |
| 2012/0249477 A1 | 10/2012 | Popovich et al. |
| 2012/0256882 A1 | 10/2012 | Christiansson et al. |
| 2012/0268403 A1 | 10/2012 | Christiansson |
| 2013/0021300 A1 | 1/2013 | Wassvik |
| 2013/0044073 A1 | 2/2013 | Christiansson et al. |
| 2013/0076582 A1 | 3/2013 | Nysen |
| 2013/0141651 A1* | 6/2013 | Kuromizu ............ G02B 6/0088 348/739 |
| 2015/0205441 A1* | 7/2015 | Bergstrom ............ G06F 3/0421 345/175 |

FOREIGN PATENT DOCUMENTS

| | | |
|---|---|---|
| CN | 102171637 | 8/2011 |
| KR | 20100058397 A | 6/2010 |
| WO | WO 2005/026938 | 3/2005 |
| WO | WO 2008/004103 | 1/2008 |
| WO | WO 2014/016685 | 1/2014 |

OTHER PUBLICATIONS

U.S. Office Action, U.S. Appl. No. 13/947,421, dated Apr. 16, 2015, 13 pages.
Chinese Second Office Action, Chinese Application No. 201380049573.7, dated Jun. 2, 2017, 8 pages.
Chinese First Office Action, Chinese Application No. 201380049573.7, dated Jan. 4, 2017, 38 pages.
Taiwan Office Action, Taiwan Application No. 102126525, dated Aug. 21, 2017, 7 pages.
PCT International Search Report and Written Opinion, PCT Application No. PCT/162013/002065, dated Dec. 16, 2013, 10 pages.
United States Office Action, U.S. Appl. No. 15/194,368, dated Mar. 13, 2017, 11 pages.
United States Office Action, U.S. Appl. No. 15/194,368, dated Oct. 20, 2016, 9 pages.

\* cited by examiner

AUGMENTED OPTICAL WAVEGUIDE FOR USE IN AN OPTICAL TOUCH SENSITIVE DEVICE

CROSS REFERENCE TO RELATED APPLICATIONS

This application is a continuation of U.S. application Ser. No. 15/194,368, filed Jun. 27, 2016, which is a continuation of U.S. application Ser. No. 13/947,421, filed Jul. 22, 2013, now U.S. Pat. No. 9,405,382, which application claims the benefit of U.S. Provisional Application No. 61/674,958, filed on Jul. 24, 2012, and U.S. Provisional Application No. 61/701,141, filed on Sep. 14, 2012, all of which are hereby incorporated by reference in their entirety.

BACKGROUND

1. Field of Art

This invention generally relates to optical touch-sensitive devices, especially an augmented optical waveguide for use in an optical touch-sensitive device.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

However, many of these approaches currently suffer from drawbacks. For example, some technologies may function well for small sized displays, as used in many modern mobile phones, but do not scale well to larger screen sizes as in displays used with laptop or even desktop computers. Another drawback for some technologies is their inability or difficulty in handling multitouch events. A multitouch event occurs when multiple touch events occur simultaneously. Another drawback is that technologies may not be able to meet increasing resolution demands.

Another drawback for some optical touch-sensitive devices is that light propagation in optical waveguides in such devices may be altered by attaching materials (e.g., a display) with unknown optical properties to the optical waveguides. Light typically propagates in such an optical waveguide via total internal reflection (TIR). TIR usually requires light to be trapped in a transmission medium that has a higher refractive index than its surrounding materials (usually air, with a refractive index of approximately 1). Any object with unknown optical properties, or optical properties incompatible with TIR, that is in contact with the optical waveguide will likely reduce the optical energy propagating in the waveguide. This may make measurement of touch-induced transmission loss more difficult and lower touch sensing robustness, adversely affecting the touch sensing performance of such an optical touch-sensitive device.

Thus, there is a need for augmented optical waveguides for use in optical touch-sensitive systems.

SUMMARY

An optical touch-sensitive device is able to determine the locations of multiple simultaneous touch events. The optical touch-sensitive device includes multiple emitters and detectors coupled with an optical coupler assembly through a waveguide on the surface on the optical-touch sensitive device. Each emitter produces optical beams which propagate in the waveguide via total internal reflection and are received by the detectors. Touch events disturb the optical beams, and are determined based on the disturbances. The waveguide has at least one dead zone on its surface. The dead zone is formed with a cover layer having a top surface and a bottom surface where the bottom surface of the cover layer is directly coupled to the top surface of the waveguide. The cover layer preserves optical beam propagation in the waveguide and makes the dead zone insensitive to touches on the top surface of the cover layer.

BRIEF DESCRIPTION OF DRAWINGS

Embodiments of the present invention will now be described, by way of example, with reference to the accompanying drawings, in which.

DETAILED DESCRIPTION

I. Introduction

A. Device Overview

Figure 1:
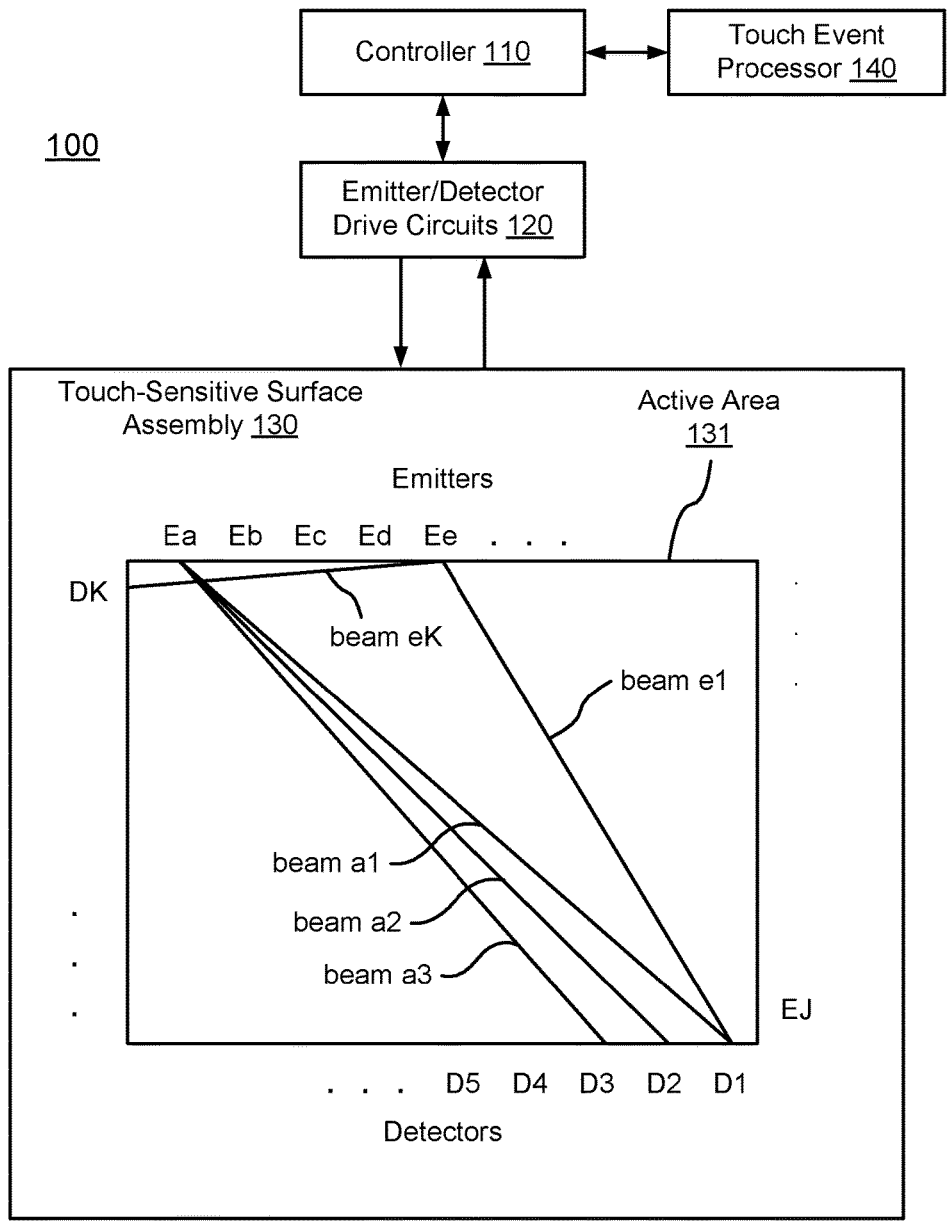
FIG. 1 is a diagram of an optical touch-sensitive device, according to one embodiment.

FIG. 1 is a diagram of an optical touch-sensitive device 100, according to one embodiment. The optical touch-sensitive device 100 includes a controller 110, emitter/detector drive circuits 120, and a touch-sensitive surface assembly 130. The surface assembly 130 includes an active area 131 over which touch events are to be detected. For convenience, the active area 131 may sometimes be referred to as the active surface or surface, as the active area itself may be an entirely passive structure such as an optical waveguide. The assembly 130 also includes emitters and detectors arranged along the periphery of the active area 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active area 131 will disturb certain beams, thus changing what is received at the detectors Dk. Data about these changes is communicated to the touch event processor 140, which analyzes the data to determine the location(s) (and times) of touch events on surface 131.

B. Process Overview

Figure 2:
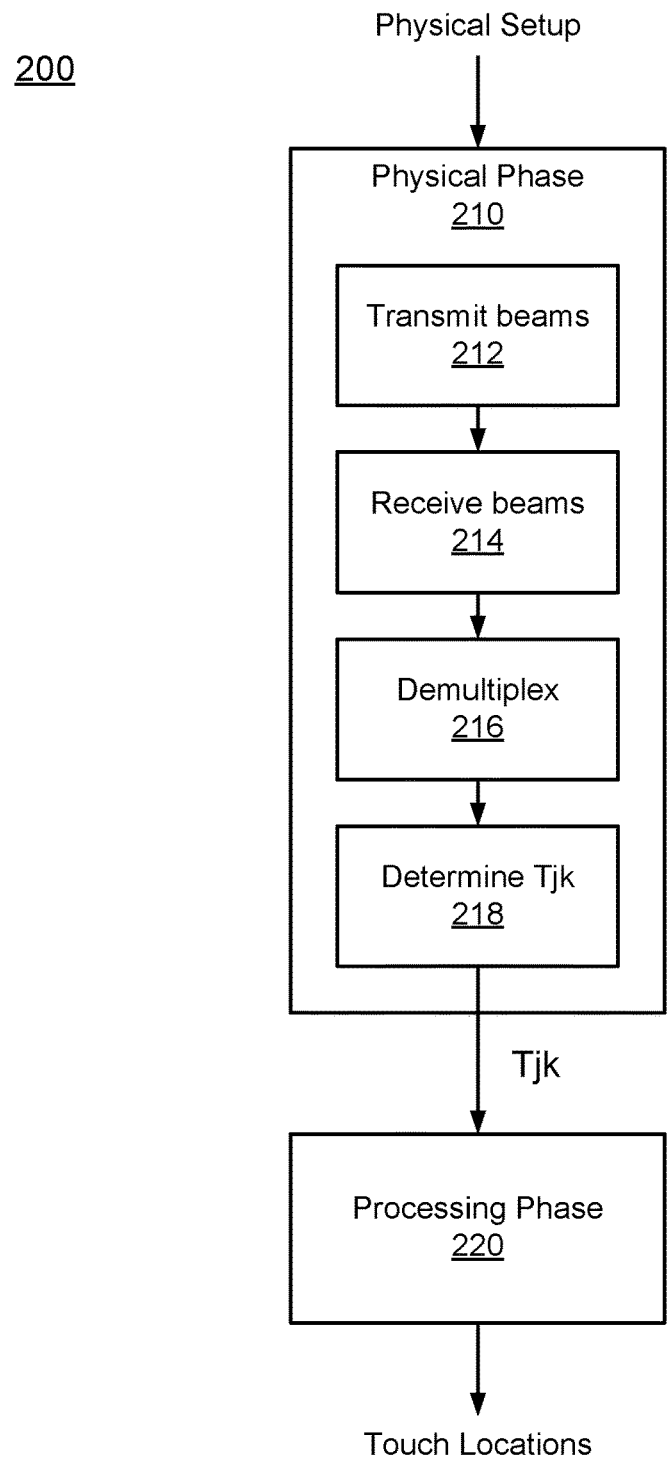
FIG. 2 is a flow diagram for determining the locations of touch events, according to one embodiment.

FIG. 2 is a flow diagram for determining the locations of touch events, according to one embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk.

The transmission coefficient Tjk is the transmittance of the optical beam from emitter j to detector k, compared to what would have been transmitted if there was no touch event interacting with the optical beam.

The use of this specific measure is purely an example. Other measures can be used. In particular, since we are most interested in interrupted beams, an inverse measure such as (1−Tjk) may be used since it is normally 0. Other examples include measures of absorption, attenuation, reflection or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector.

The interior of block 210 shows one possible implementation of process 200. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 can also be implemented in many different ways. Candidate touch points, line imaging, location interpolation, touch event templates and multi-pass approaches are all examples of techniques that may be used as part of the processing phase 220.

II. Physical Set-up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

B. Touch Interactions

Figure 3A:
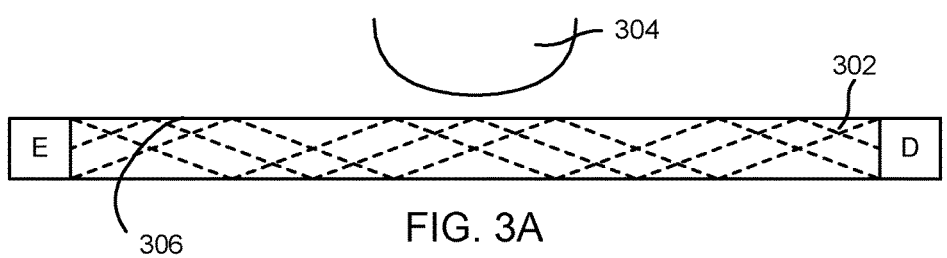
FIGS. 3A-3B illustrate a frustrated TIR mechanism for a touch interaction with an optical beam.
Figure 3B:
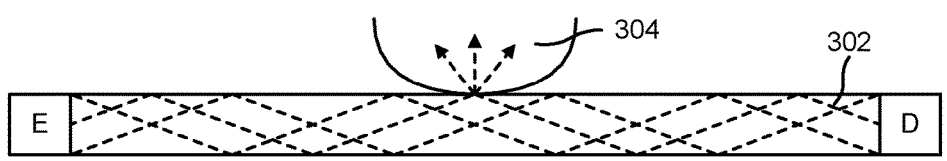

Different mechanisms for a touch interaction with an optical beam can be used. One example is frustrated total internal reflection (TIR). In frustrated TIR, an optical beam is confined to an optical waveguide by total internal reflection and the touch interaction disturbs the total internal reflection in some manner. FIGS. 3A-3B illustrate a frustrated TIR mechanism for a touch interaction with an optical beam 302.

The touch interactions can also be direct or indirect. In a direct interaction, the touching object 304 (e.g., a finger or stylus) is the object that interacts with the optical beam 302. For example, a finger may have a higher index of refraction than air, thus frustrating TIR when the finger comes into direct contact with a top surface 306 of the waveguide. In an indirect interaction, the touching object interacts with an intermediate object, which interacts with the optical beam. For example, the finger may cause a high index object to come into contact with the waveguide, which may cause a change in the index of refraction of the surrounding materials of the waveguide.

Figure 3C:
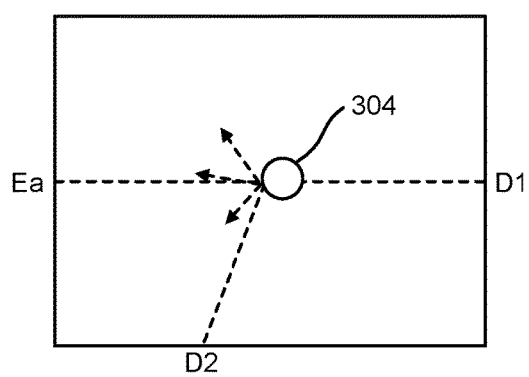
FIG. 3C illustrates a touch interaction with an optical beam enhancing transmission.

Note that some types of touch interactions can be used to measure contact pressure or touch velocity, in addition to the presence of touches. Also note that some touch mechanisms may enhance transmission, instead of or in addition to reducing transmission. FIG. 3C illustrates a touch interaction with an optical beam enhancing transmission. For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples include non-blocking and fully blocking, or non-blocking and 10%+ attenuation, or not frustrated and frustrated TIR. An analog interaction is one that has a "grayscale" response to the touch: non-blocking passing continuously or in a gradated or stepped manner from partially blocking to blocking.

C. Emitters, Detectors and Couplers

Each emitter transmits light to a number of detectors. Usually, each emitter outputs light to more than one detector simultaneously. Similarly, each detector receives light from a number of different emitters. The optical beams may be visible, infrared (IR) and/or ultraviolet (UV) light. The term "light" is meant to include all of these wavelengths and terms such as "optical" are to be interpreted accordingly. The wavelength range of interest encompasses a large spectrum, including but not limited to a range from 200 nm to 2000 nm, or any sub-range therein including, for example, 800 nm to 980 nm.

Examples of the optical sources for the emitters include light emitting diodes (LEDs) and semiconductor lasers. IR sources can also be used. Modulation of the optical beams can be external or internal. Examples of sensor elements for the detector include charge coupled devices, photodiodes, photoresistors, phototransistors, and nonlinear all-optical detectors.

The emitters and detectors may also include optics and/or electronics in addition to the main optical source and sensor element. For example, emitters and detectors may incorporate or be attached to lenses to spread and/or collimate emitted or incident light. Additionally, one or more optical coupling assemblies (couplers) of varying design can be used to couple the emitters and detectors to the waveguide. The waveguide, coupler, and any intervening optical elements all have a similar refractive index that is higher than that of air to facilitate TIR throughout the entire optical path of each beam. These elements may be physically coupled together using a bonding agent that has a similar refractive index to the waveguide and coupler. Alternatively, at various points along the optical path air gaps may be present between elements in place of a bonding agent.

D. Optical Beam Paths

Figure 4A:
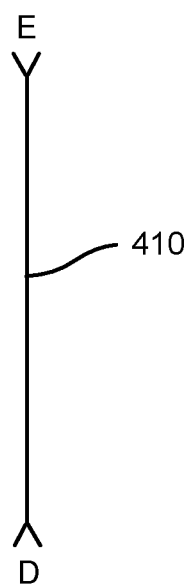
FIGS. 4A-4C are top views of differently shaped beam footprints.
Figure 4B:
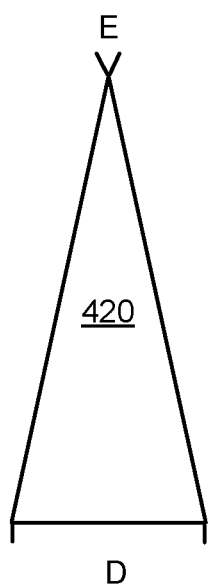
Figure 4C:
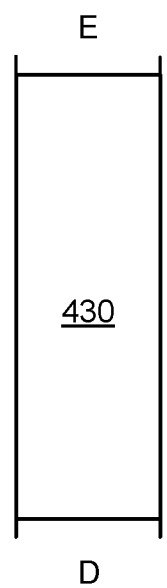

FIGS. 4A-4C are top or side views of differently shaped beam footprints. Another aspect of a touch-sensitive system is the shape and location of the optical beams and beam paths. In FIG. 1, the optical beams are shown as lines. These lines should be interpreted as representative of the beams, but the beams themselves may be different shapes and footprints. A point emitter and point detector produce a narrow "pencil" beam with a line-like footprint. A point emitter and wide detector (or vice versa) produce a fan-shaped beam with a triangular footprint. A wide emitter and wide detector produce a "rectangular" beam with a rectangular footprint of fairly constant width. Depending on the width of the footprint, the transmission coefficient Tjk behaves as a binary or as an analog quantity. It is binary if the transmission coefficient transitions fairly abruptly from one extreme value to the other extreme value as a touch point passes through the beam. For example, if the beam is very narrow, it will either be fully blocked or fully unblocked. If the beam is wide, it may be partially blocked as the touch point passes through the beam, leading to a more analog behavior.

Beams may have footprints in both the lateral (horizontal) direction, as well as in the vertical direction. The lateral footprint of a beam may be the same or different from the horizontal footprint of a beam.

The direction and spread of the light emitted from the emitters and received by the detectors may vary in spread or angle from beam footprints intended to cover the active area 131. To shape the beams to achieve the intended footprints, lenses may be attached to the emitters and detectors. For example, point emitters and detectors may be used in conjunction with lenses to spread beams in the horizontal or vertical directions.

Figure 5A:
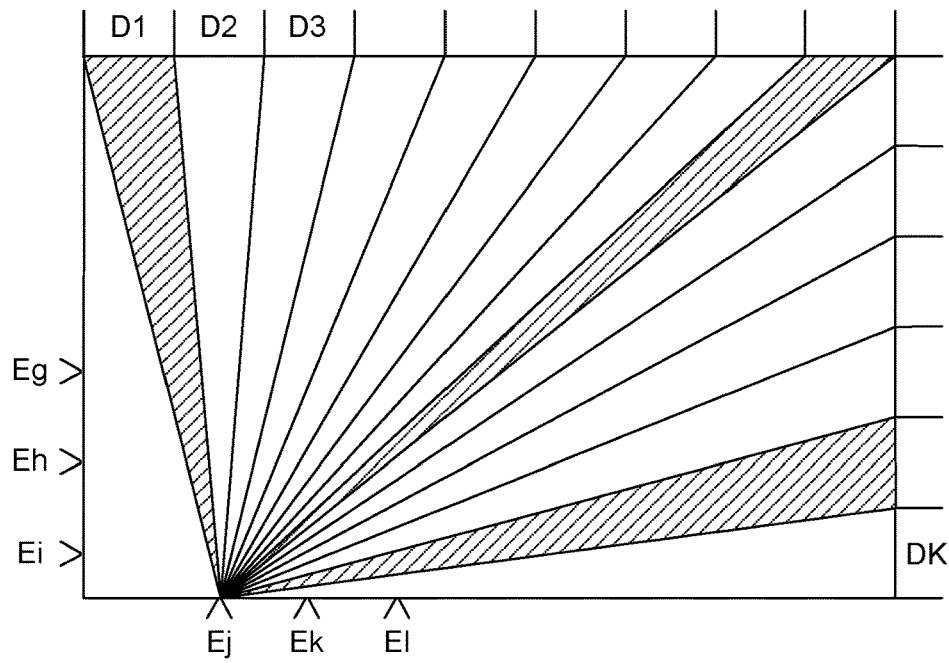
FIGS. 5A-5B are top views illustrating active area coverage by emitters and detectors.
Figure 5B:
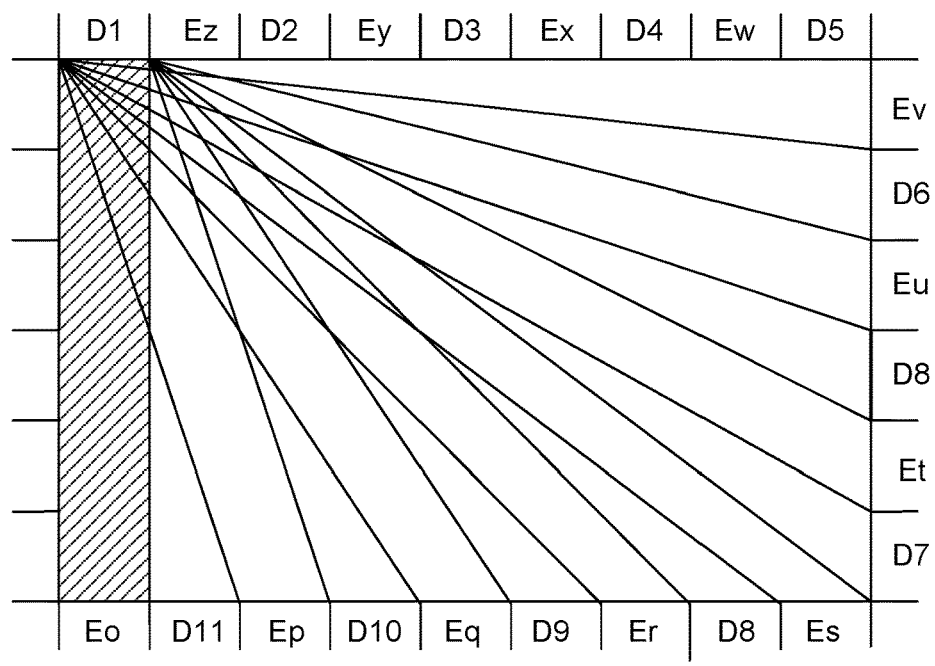

FIGS. 5A-5B are top views illustrating active area coverage by emitters and detectors. As above, the emitters and detectors are arranged along the periphery of the active area. All the emitters may be arranged on two sides of the active area, for example two adjacent perpendicular sides as illustrated in FIG. 5A. Similarly, all of detectors may be arranged on the other two sides of the active area. Alternatively, the emitters and detectors may be mixed or interleaved according to a pattern as illustrated in FIG. 5B. This pattern may be one emitter in between each detector, or another more complicated arrangement.

In most implementations, each emitter and each detector will support multiple beam paths, although there may not be a beam from each emitter to every detector. The aggregate of the footprints from all beams from one emitter will be referred to as that emitter's coverage area. The coverage areas for all emitters can be aggregated to obtain the overall coverage for the system.

The footprints of individual beams can be described using different quantities: spatial extent (i.e., width), angular extent (i.e., radiant angle for emitters, acceptance angle for detectors) and footprint shape. An individual beam path from one emitter to one detector can be described by the emitter's width, the detector's width and/or the angles and shape defining the beam path between the two. An emitter's coverage area can be described by the emitter's width, the aggregate width of the relevant detectors and/or the angles and shape defining the aggregate of the beam paths from the emitter. Note that the individual footprints may overlap. The ratio of (the sum of an emitter's footprints)/(emitter's cover area) is one measure of the amount of overlap.

The overall coverage area for all emitters should cover the entirety of the active area 131. However, not all points within the active area 131 will be covered equally. Some points may be traversed by many beam paths while other points traversed by far fewer. The distribution of beam paths over the active area 131 may be characterized by calculating how many beam paths traverse different (x,y) points within the active area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

The concepts described above for emitters also apply to detectors. A detector's coverage area is the aggregate of all footprints for beams received by the detector.

III. Optical Coupler Assemblies and Related Hardware

A. General Description

Figure 6:
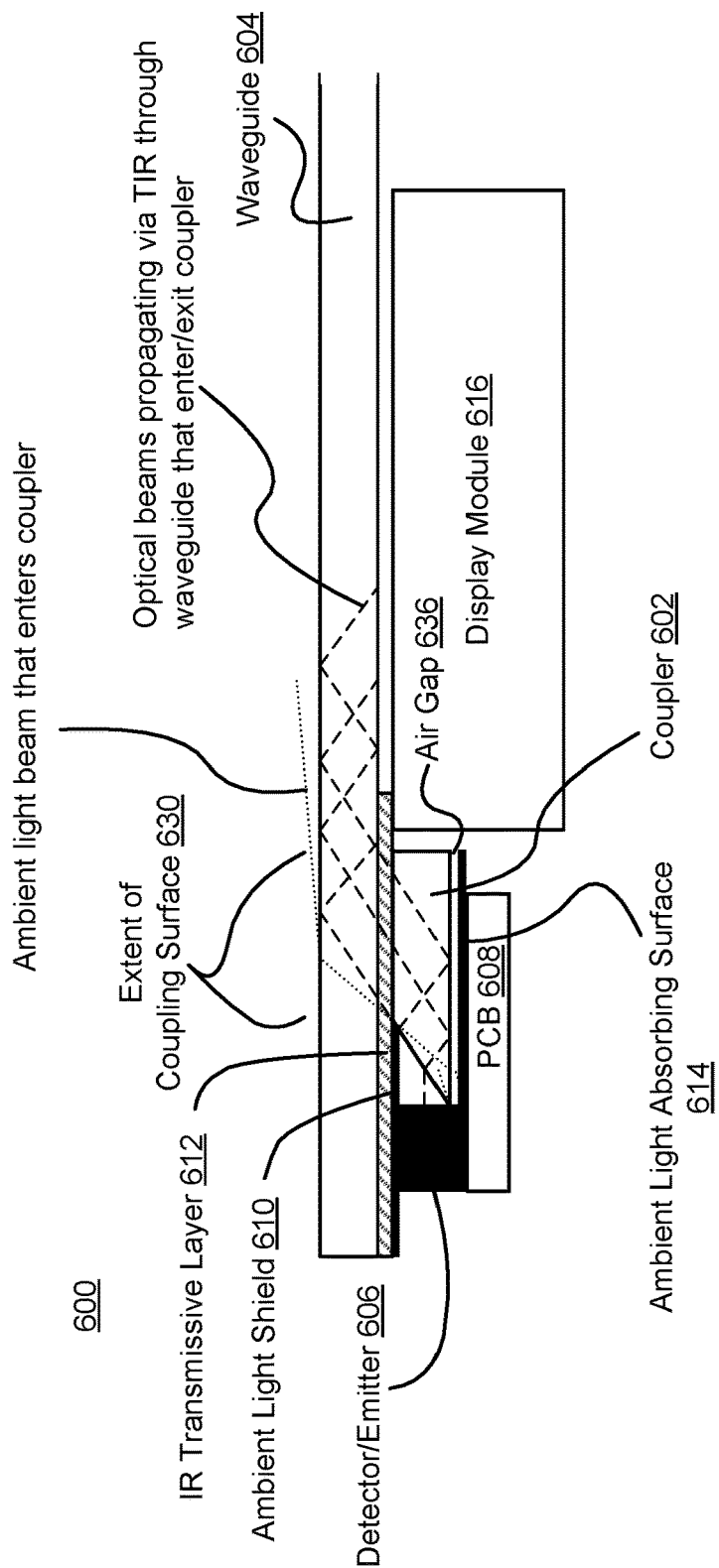
FIG. 6 is a side view of an optical touch-sensitive device including a side coupled optical coupler assembly.
Figure 7:
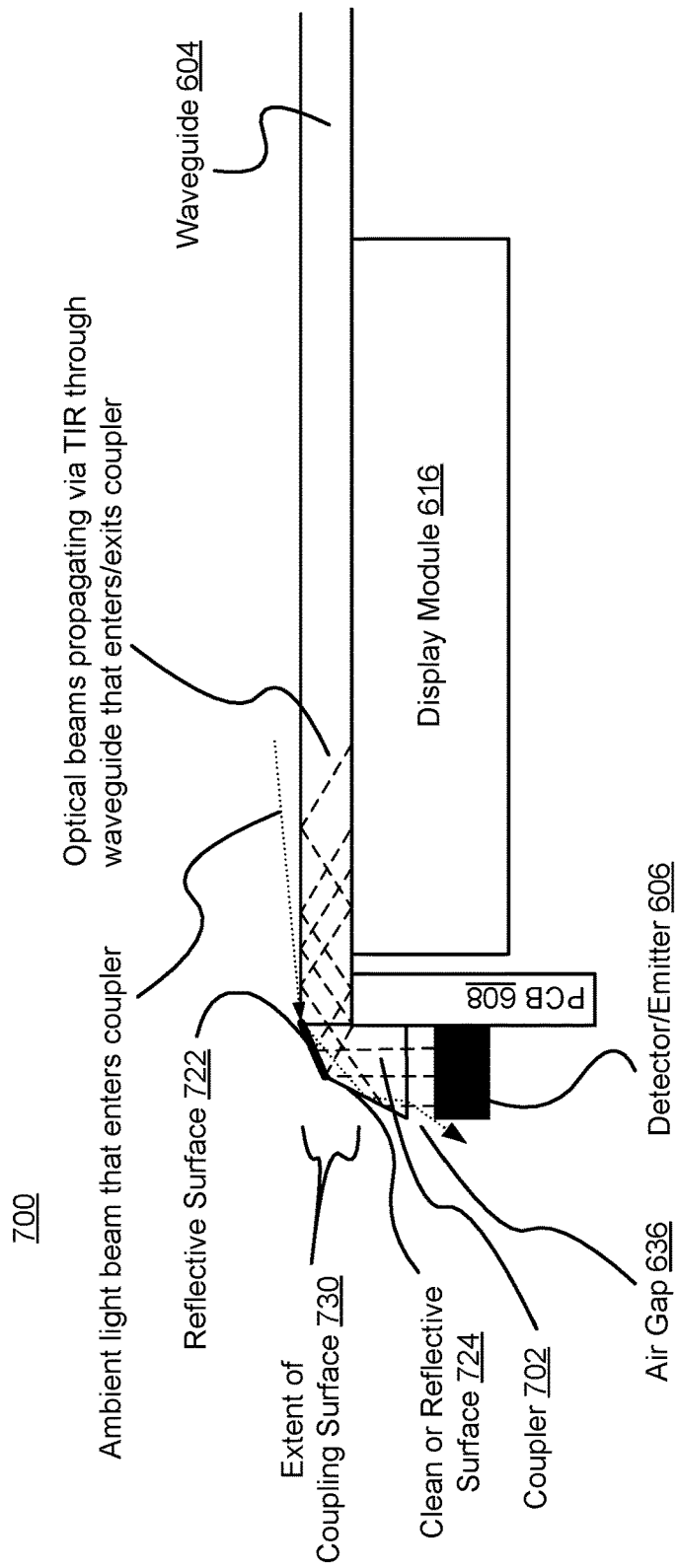
FIG. 7 is a side view of an optical touch-sensitive device including an edge coupled optical coupler assembly.

FIGS. 6 and 7 are side views of an optical touch-sensitive device including a side 602 and an edge 702 coupled optical coupler assembly, respectively. As introduced above, the optical touch-sensitive device 600, 700 includes a planar optical waveguide 604 that is optically coupled to the emitters and detectors 606 with an optical coupler assembly (or coupler) 602 or 702. The optical touch-sensitive device 600, 700 may also include any one or more of a printed circuit board (PCB) 608, an ambient light shield 610, an IR transmissive layer 612, one or more air gaps 636 and associated ambient light absorbing surfaces 614, and a display module 616. The ambient light shield 610 may be made of a light reflective material or a light absorbing material.

The waveguide 604 extends past the lateral edge of the display module. The waveguide may be constructed of a material that is rigid or flexible. In one embodiment, the waveguide includes a single plane of material. Regardless of the type of material used to construct the waveguide, the waveguide has a top surface that is substantially or exactly parallel to its bottom surface. The top surface of the waveguide is oriented to receive touch input. The bottom or side edge surface of the waveguide, depending upon the implementation, is optically coupled to the coupler outside the lateral extent of the display module (e.g., the viewing area of the display). As described above, optical beams travel through the waveguide using TIR. That is, optical beams reflect off of the top and bottom surfaces of the waveguide at angles greater than a critical angle from the normal to the top and bottom surfaces of the waveguide. Touch events, detected using frustrated TIR, are received within an active area 131 of the top surface of the waveguide.

The coupler may be side coupled 602, as illustrated in FIG. 6, or edge coupled 702, as illustrated in FIG. 7, to the waveguide. For both the side coupled and edge coupled cases, the coupler may also be configured to reorient beams to accommodate any orientation of emitters and detectors with respect to the waveguide. The coupler may also be configured to translate beams laterally or vertically to accommodate any position of emitters and detectors. The coupler, and touch-sensitive device more generally, are also configured to prevent or reduce ambient light entering the waveguide from hitting the emitters and detectors.

The coupler may be formed with a single piece of material, or with several optically coupled pieces. Each emitter and detector 606 may have its own coupler to couple light into and out of the waveguide. Alternatively, emitters and/or detectors may share a coupler. The coupler may be made with any number of materials including, for example, glass or plastic.

The emitters and detectors 606 are arranged beneath the bottom surface of the waveguide along the periphery of the display module. Positioning the emitters and detectors along the periphery of the display module includes positioning the emitters and detectors outside the outer side edge of the display module, so that the emitters and detectors are to the side, laterally, around the display module. Positioning the emitters and detectors along the periphery of the display module also includes positioning the emitters and detectors underneath the bottom side of the display module near the side edge of the display module. The emitters and detectors are electrically coupled to the PCB 608 which may include or electrically couple to the emitter/detector drive circuits 120.

The optical touch-sensitive device is configured to operate in conjunction with a display (or screen) module 616 configured to display images, however the display module is not necessarily part of the optical touch sensitive device. The display module is illustrated for clarity. The drawings of the device in FIGS. 6-7 are not to scale, and it is expected that the display module 616 and active area 131 will in practice be much larger than the coupler and related hardware.

B. Side Coupled Optical Couplers

FIG. 6 is a side view of an optical touch-sensitive device 600 including a side coupled optical coupler assembly 602. In device 600, the detectors and emitters 606 are oriented to receive and emit light, respectively, in a direction parallel to the top and bottom surfaces of the waveguide 604, such that light exits the emitters and enters the detectors in substantially the same lateral direction it travels laterally through the waveguide 604.

The coupler 602 is side coupled to the bottom surface of the waveguide 604. Generally, the side coupling consists of a single planar coupling surface 630 on the top surface of the coupler 602 that is optically coupled, directly or indirectly, to the bottom surface of the waveguide 604. Although as illustrated the coupling surface 630 is the entirety of one surface of the coupler 602, this need not be the case.

C. Edge Coupled Optical Couplers

FIG. 7 is a side view of an optical touch-sensitive device 700 including an edge coupled optical coupler assembly 702. In coupler 702, the detectors and emitters 606 are oriented to receive and emit light, respectively, in a direction perpendicular to the top and bottom surfaces of the waveguide 604, such that light exits the emitter in a direction rotated by ninety degrees with respect to the direction it travels laterally through the waveguide 604.

The coupler 702 is edge coupled to a side edge surface of the waveguide 604. Generally, the edge coupling consists of a single planar coupling surface 730 on a side edge surface of the coupler 702 that is optically coupled, directly or indirectly, to the side edge of the waveguide 604. The coupler 702 may include a reflective surface 722 and a clean or reflective surface 724.

D. Display and Associated Hardware

Figure 8A:
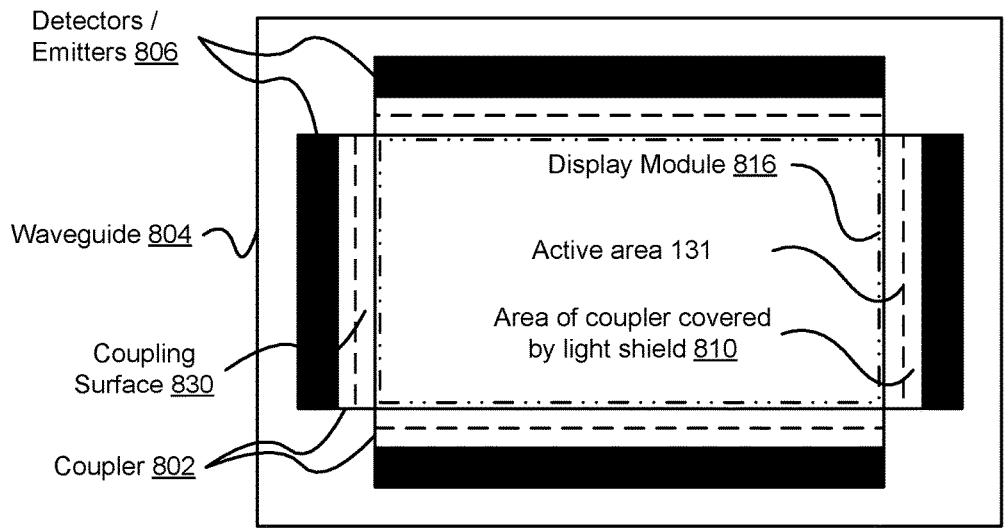
FIGS. 8A-8B are top views of an optical touch-sensitive device including a side coupled optical coupler assembly and a display module.
Figure 8B:
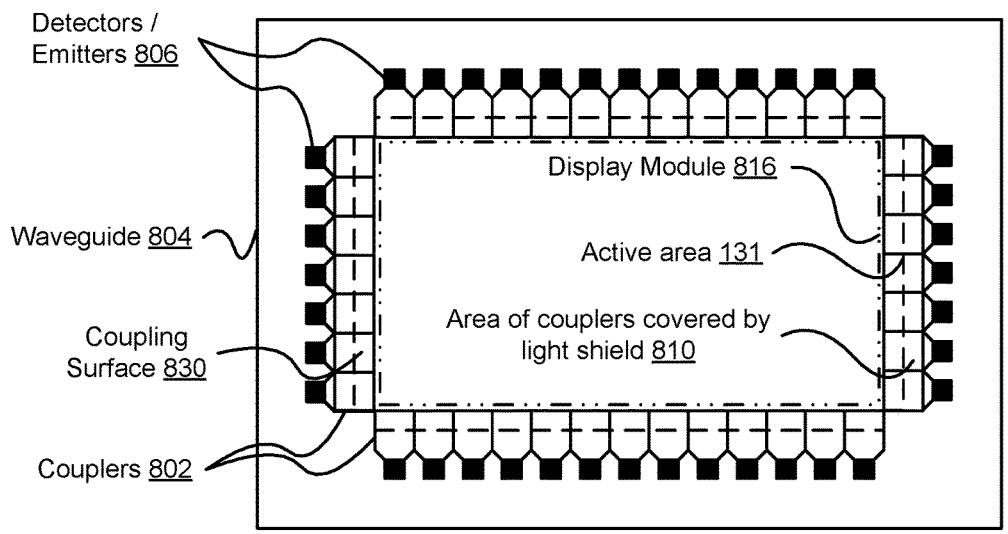

FIGS. 8A-8B are top views of an optical touch-sensitive device including a side coupled optical coupler assembly and a display module. The top view illustrates the relative lateral extents of the waveguide 804, the display module 816, and the active area 131. In this example, the waveguide 804 extends laterally past and covering the display module 816, couplers 802 including the coupling surface 830, and emitters/detectors 806. From top down, a portion of the coupler is the coupling surface 830, and another portion is covered by the light shield 810.

FIG. 8A illustrates an implementation where relatively few couplers 802 (in this case four) are each shared between a number of emitters and/or detectors 806. FIG. 8B illustrates an implementation where each emitter/detector 806 has its own coupler 802. In another implementation, a single coupler may be shared between all emitters and detectors (not shown).

Figure 9:
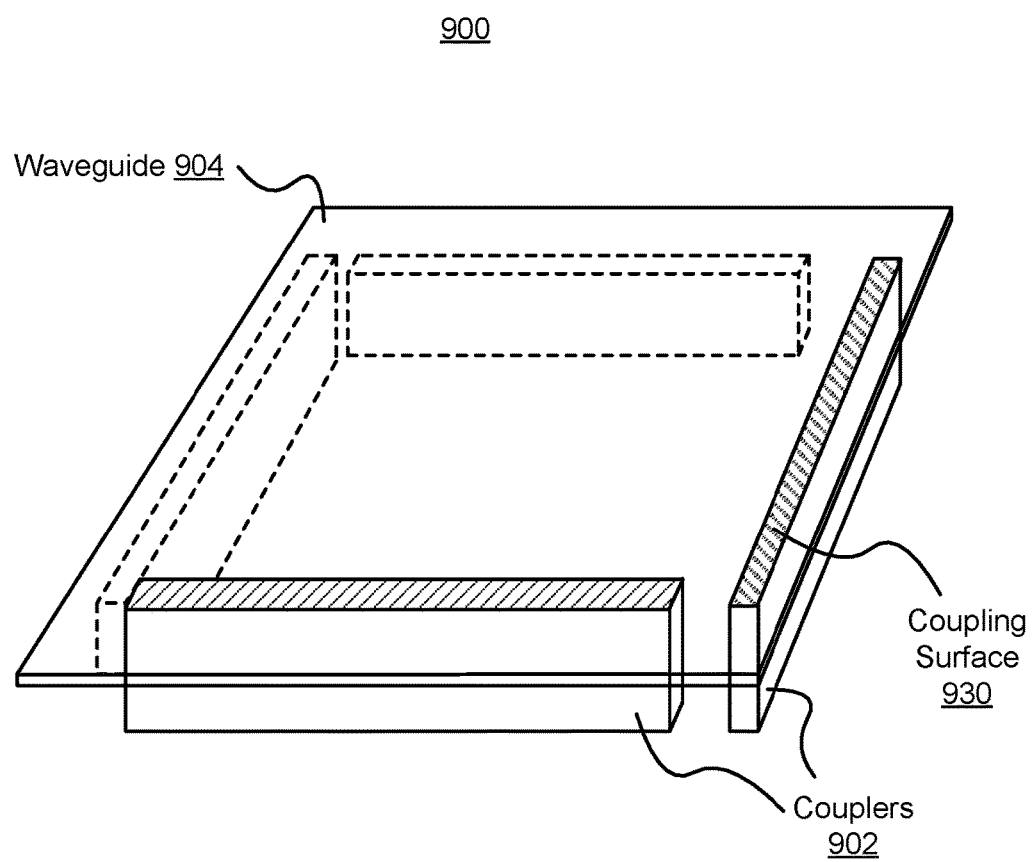
FIG. 9 is a perspective view of an optical touch-sensitive device including a side coupled optical coupler assembly.

FIG. 9 is a perspective view of an optical touch-sensitive device 900 including a side coupled optical coupler assembly. In this example, the couplers 902 are positioned below the bottom surface of the waveguide 904 and also near the edges of the waveguide to leave room for a display in the middle of the touch-sensitive device. Light is injected into and/or extracted from the waveguide 904 at the coupling surface 930. In one implementation, the coupling surface 930 is attached to the waveguide 904 via optically clear adhesive (OCA). Alternatively, other methods that enable a good transfer of light energy between the couplers 902 and the waveguide 904 may be used. The OCA binding the couplers to the waveguide may not be explicitly shown in all figures. Typically, OCA is transparent to visible light and/or optical beams propagating in the waveguide.

In one approach, an OCA layer (either in liquid form or in the form of a tape adhesive) is attached to the waveguide 904 first, and the couplers 902 are attached to the waveguide via the OCA layer. Alternatively, an OCA layer may be attached to each coupler first, and the OCA-covered couplers are then attached to the waveguide. A fixture may be used for guidance to precisely place and attach the couplers to the waveguide.

IV. Intermediate Layer

A. General Description

An intermediate layer may be used to augment the waveguide of the optical touch sensitive device. In most cases, the intermediate layer helps preserve light propagation in the waveguide. This is useful, for example, when the waveguide, particularly the side opposite to the surface intended to receive touch events (e.g., the bottom surface), is attached to another object with unknown optical properties, or optical properties that are incompatible with TIR (e.g., the object has a higher refractive index than that of the waveguide). Generally, the attached object is affixed in continuous contact with the waveguide in a manufactured touch sensitive device. The attached object may be a display, a non-display surface, a transparent structure, a non-transparent structure, a thin film (transparent or not), and/or a coating (e.g., a thin layer of compound).

Alteration of the interface between the waveguide and its surrounding medium is generally undesirable. In total internal reflection, light is trapped in a transmission medium (e.g., the waveguide) having a higher refractive index (RI) than the surrounding medium (usually air, with a refractive index of approximately 1). As a result, any object touching the waveguide may potentially reduce the optical energy propagating in the waveguide if the object has optical properties that are incompatible with TIR. This may adversely affect the touch-sensitive device's touch sensing performance. For example, reduced optical energy in the waveguide may make measurement of touch-induced transmission loss more difficult, which lowers touch sensing robustness.

Augmenting the waveguide with an intermediate layer significantly reduces the abovementioned negative impacts of the attached object. Generally, the waveguide is augmented by interposing an intermediate layer between the waveguide and the attached object. The intermediate layer not only provides a desired mechanical binding function, but also modifies the waveguide interface with known and controlled optical properties of the intermediate layer.

In one embodiment, the intermediate layer has a refractive index smaller than the refractive index of the waveguide. In this embodiment, the intermediate layer is said to be constructed of a low-RI material, and may also be referred to as a low-RI layer. The low RI layer preserves optical beam propagation in the waveguide via TIR. In another embodiment, the intermediate layer is a mirror or includes a mirrored surface for optical beams propagating in the waveguide, and optical beam propagation in the waveguide is preserved via specular reflection. In this embodiment, the intermediate layer is also referred to as a mirror layer. The mirror layer may be configured to be reflective of the optical beams propagating in the waveguide, but transparent to visible light.

B. Attachment and Mechanism of Operation

Figure 10A:
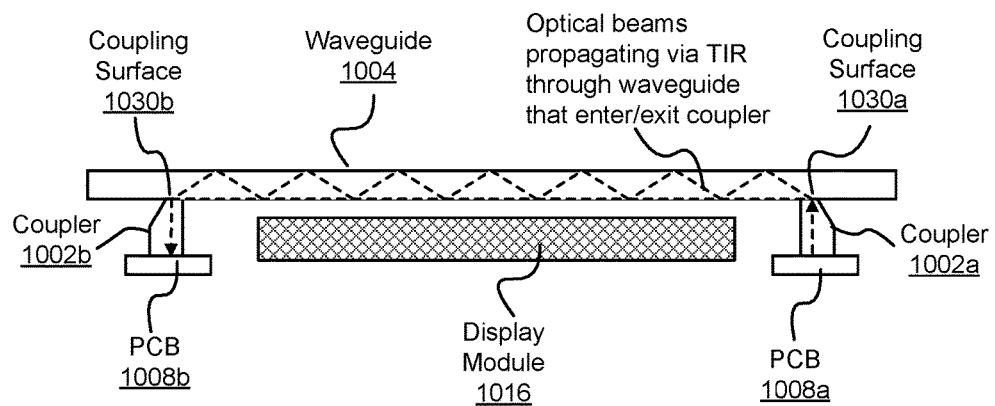
FIG. 10A is a side view of an optical touch-sensitive device with an air gap between the display and the waveguide.

FIG. 10A is a side view of an optical touch-sensitive device with an air gap between the display and the waveguide. In this example, PCBs 1008a and 1008b are directly attached to couplers 1002a and 1002b, respectively. The emitters and detectors (not shown) are electrically coupled to the PCBs which may include or electrically couple to the emitter/detector drive circuits 120. The position and orientation of the emitters and detectors relative to the couplers are designed to have a high amount of light transfer between them. In an alternate embodiment, the PCBs are not directly attached to the couplers, but indirectly via, for example, a device chassis (not shown). Illustratively, an optical beam is shown that is generated from an emitter connected to the PCB 1008a. The beam then propagates through coupler 1002a, enters the waveguide 1004 through the coupling surface 1030a, propagates in the waveguide 1004 via TIR, exits the waveguide 1004 and enters the coupler 1002b through the coupling surface 1030b, propagates through the coupler 1002b, and finally reaches a detector connected to the PCB 1008b. To avoid interfering with the visible images from the display, the optical beams propagating in the waveguide typically have near IR wavelengths ranging from 800 nm to 980 nm. Other wavelengths are also possible.

A display module 1016 is positioned in between the couplers 1002a and 1002b, but does not directly touch the waveguide. That is, there is an air gap between the waveguide and the display module. The waveguide 1004 shown in FIG. 10A is therefore not augmented as there is no intermediate layer.

There are several possible reasons to augment the waveguide. As shown in FIG. 10A, the waveguide may function as a thin protective layer of cover glass for the display module. This thin layer of cover glass may be easily broken due to for example mechanical shocks. Laminating the waveguide to the display makes the touch-sensitive device more robust to mechanical shocks. Parallax may also be reduced thanks to the lamination because the distance between the display and the waveguide is reduced (e.g., no air gap). Further, laminating the waveguide to the display can prevent significant deflection of the waveguide when touched from the top, thus avoiding a situation where the waveguide may physically contact the display and alter image quality.

Figure 10B:
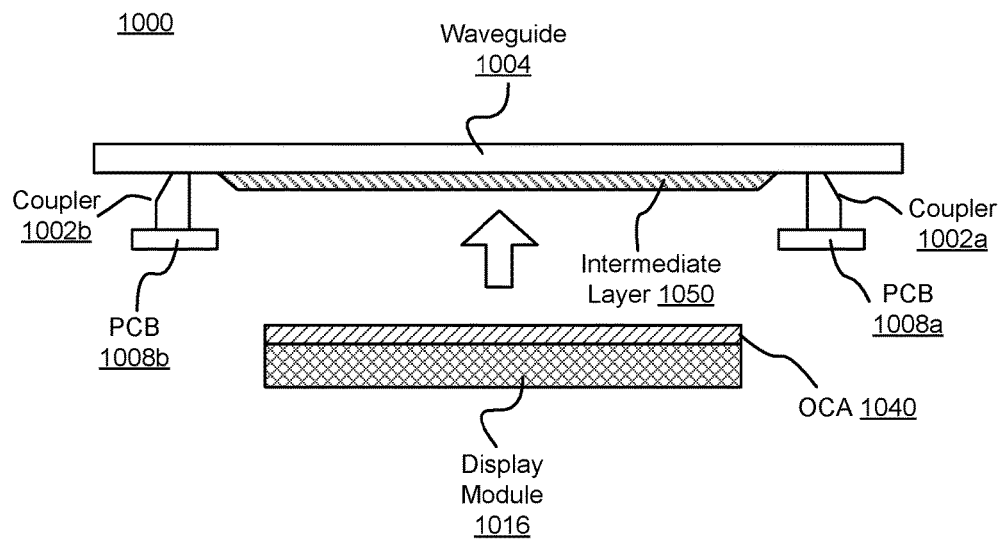
FIG. 10B is a side view of an optical touch-sensitive device with an augmented waveguide.

FIG. 10B is a side view of an optical touch-sensitive device 1000 with an augmented waveguide. The augmented waveguide 1004 is shown with an intermediate layer 1050 attached to its bottom. The display module 1016 is to be attached to the waveguide, as shown by an arrow. In this example, a thin layer of OCA 1040 is attached to the display top surface. The OCA layer 1040 may be in the form of a film or resin which can be cured by exposure to UV, heat, humidity, or a combination of them. The OCA layer 1040 attaches the display module 1016 to the intermediate layer 1050 at the bottom surface of the waveguide 1004. Both the OCA layer 1040 and the intermediate layer 1050 are transparent to visible light to allow images on the display to be viewed through the waveguide.

In one embodiment, the OCA layer may function as the intermediate layer, thereby waiving the need of having a separate intermediate layer. For example, the OCA layer may have a smaller refractive index than that of the waveguide. In this case, the OCA layer functions both as an intermediate layer and a mechanical binding layer.

The intermediate layer 1050 extends across the waveguide at least to cover the surface of the display module 1016, but not necessarily extending to or beyond the couplers 1002. Generally, light passes from the coupler to the waveguide without interacting with the intermediate layer as the lateral extent of the intermediate layer 1050 is limited so as not to cover the border of the waveguide. To achieve this, the optical touch-sensitive device 1000 is manufactured using a masking layer to cover the border of the touch-sensitive device. The masking layer may be applied to the bottom surface of the waveguide prior to deposition of the intermediate layer 1050. After the deposition of the intermediate layer is completed, the masking layer can be removed, leaving a frame of clear glass on the bottom surface of the waveguide. In one approach, the couplers 1002 are positioned on the border and attached to the clear glass frame via OCA, with no intermediate layer in between.

Figure 10C:
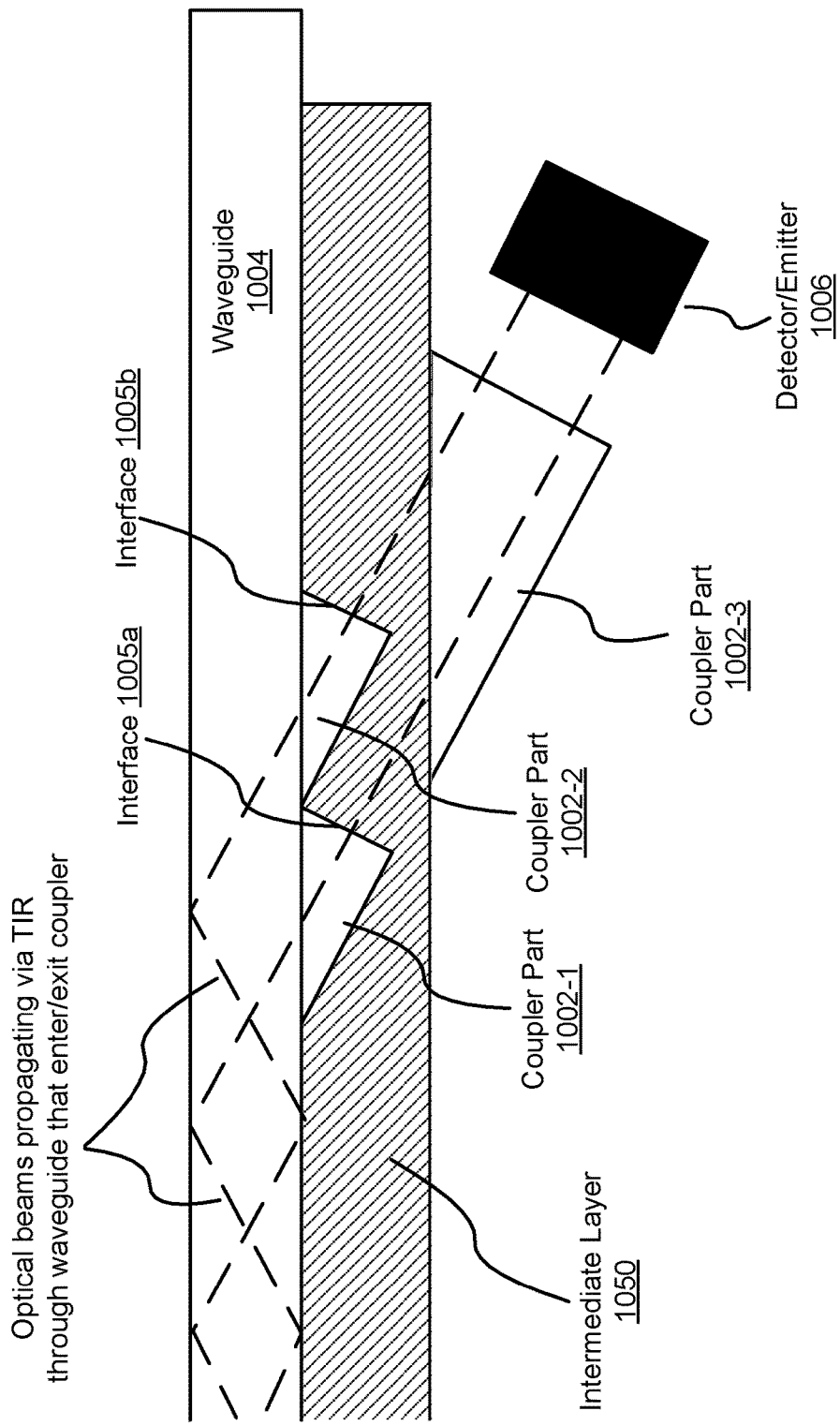
FIG. 10C is a side view of an optical touch-sensitive device with an augmented waveguide where optical beams pass through the intermediate layer to reach the emitters/detectors.

FIG. 10C is a side view of an optical touch-sensitive device with an augmented waveguide where optical beams pass through the intermediate layer to reach the emitters/detectors. In this example, the intermediate layer 1050 is composed of a low-RI material that is transparent to the optical beams propagating in the waveguide. The coupler 1002 is made up of several coupler parts 1002-1, 1002-2, and 1002-3. The coupler parts 1002-1 and 1002-2 are optically coupled to the waveguide 1004. In some cases, the coupler parts 1002-1 and 1002-2 may be formed as part of the waveguide 1004 by moulding the waveguide 1004 with the illustrated profile. This provides a mechanism by which light enters the waveguide 1004 at an angle greater than the critical angle between the waveguide and its surrounding air and is trapped within the waveguide 1004 via TIR. A third coupler part 1002-3 may also be optically coupled (optionally with an air gap) to the intermediate layer 1050 directs light between an emitter/detector 1006 and the intermediate layer 1050. In some cases, the third coupler part 1002-3 may be index matched to the intermediate layer 1050 to facilitate propagation of light between the detector/emitter 1006 and the intermediate layer 1050, although this is not required. In this embodiment, the coupler 1002 includes several individual coupler parts so that the overall height of the coupler 1002 may be minimized. The intermediate layer interposed between the coupler parts 1002-1/1002-2 and the coupler part 1002-3 does not totally internally reflect optical beams from the waveguide because the incidence angles at the interfaces 1005a and 1005b are less than the critical angle required for TIR. As shown in FIG. 10C, the intermediate layer 1050 extends beyond the coupler 1002 to cover the border of the waveguide 1004. This may simplify manufacturing of the optical touch-sensitive device by, for example, waiving the need of using a masking layer to cover the border of the waveguide.

The intermediate layer may be deposited at any stage prior to attaching the display module provided that the application process of the intermediate layer does not have any negative impact on any other device components. For example, a high-temperature lamination process may cause warping of optical elements that have already been attached to the waveguide. Another example of such a negative impact is delamination of layers that have already been attached to the waveguide. Delamination can be avoided by matching the surface energies of adjacent layers. The surface energy of a material is a measure of the energy available in the molecules on the surface of the material relative to the energy available in the molecules in the bulk of the material. The surface energy of a material is an important contributor to the ease of bonding to other materials. Unmatched surface energies between materials suggests that the materials are unlikely to be readily bonded. Matching of surface energies can be achieved by altering functional groups at adjacent surfaces by chemical treatment prior to attaching the adjacent layers. Functional groups are those parts of a molecule that are involved in chemical reactions and form bonds with other materials. This term is especially useful when referring to organic substances. Adhesion of the adjacent layers can also be promoted by altering the topology of the adjacent surfaces to cause at least one of two adjacent surfaces to be rough, thus increasing friction and the surface area available for an adhesive to bind the two adjacent layers.

In one embodiment, the couplers are attached to the waveguide first. Then the display module and the waveguide are laminated together with an intermediate layer also acting as a bonding layer. For example, this can be achieved by dispensing a liquid low-RI layer onto the waveguide, which will then be brought into contact with the display module. The liquid low-RI layer is then cured by UV exposure. In this example, accurate dispensing of a predefined volume of low-RI material in a predefined pattern on the waveguide can result in controlled spreading of the low-RI layer when brought into contact with the display module. Depending on the design, the low-RI material may or may not spread to be in contact with the couplers.

B.1 Low-RI Layer

In one embodiment, the intermediate layer 1050 is made of a material having a refractive index smaller than the refractive index of the waveguide. In an implementation using a low-RI layer, the low-RI layer can possess a range of refractive index values ranging from as low as air/vacuum ($n=1$) up to the refractive index of the waveguide material itself. With a refractive index in this range, the low-RI layer satisfies the condition of total internal reflection for light incident on the interface between the waveguide and the low-RI layer (e.g., the bottom surface of the waveguide).

A low-RI layer may include a fluoropolymer material or other halogenated materials, which may come from a vapor, liquid, or solid-state source and may be applied to the waveguide using an appropriate application process. For vapor phase low-RI layers, application processes include chemical vapor deposition, plasma deposition, and the like. Liquid phase low-RI layers can be applied by spin-coating, dip-coating, spray-coating, blade-coating methods, etc. Printing techniques such as screen printing may also be used to deposit liquid phase low-RI layers. Vapor and liquid phase low-RI layers are often curable by exposure to UV, heat, humidity, electron beams, or a combination of these.

Solid phase low RI-layers (e.g., fluoropolymer films) can be applied using a lamination process where the solid phase low-RI layer and/or the waveguide is brought close to or above a glass transition temperature of the low-RI layer and lamination is achieved without the use of any adhesive. Alternatively, lamination may be achieved via the use of an adhesive (e.g., OCA).

The average (or effective) refractive index of a low-RI layer may be engineered to an appropriate value by the introduction of micro- and/or nano-porosity into the low-RI layer. In this case, the low-RI layer is composed of such "porous" materials including hydrogels, xerogels, aerogels, nanofoams, etc. In one approach, such a low-RI layer may be deposited by oblique angle vacuum deposition, where materials such as silica can be formed into highly nano-porous layers of isolated columnar structures.

In most cases, the thickness of a low-RI layer is greater than at least a penetration depth of the evanescent light field in the waveguide. A low-RI layer of at least this thickness is chosen so that light propagating in the waveguide is substantially not influenced by any adjacent layer to the low-RI layer (e.g. the OCA layer 1040 which is adjacent to the intermediate layer 1050). Alternatively, a low-RI layer of thickness smaller than the penetration depth may also be used, provided that the adjacent layer to the low-RI layer has optical properties which preserve TIR and avoid excessive attenuation of light propagating in the waveguide.

B.2 Mirror Layer

In an alternate embodiment, light propagation in the waveguide is preserved via specular reflection at the interface between the intermediate layer and the waveguide. In this case, the intermediate layer is a mirror layer for optical beams propagating in the waveguide and the optical beams have wavelengths within a narrow range of IR wavelengths (e.g., a narrow band within 800 nm-980 nm). Thus, the mirror layer is a narrow band reflector for that narrow range of IR wavelengths. In one implementation, such a narrow band reflector is a thin film interference filter (e.g., a dichroic filter) which strongly reflects light with wavelengths within the narrow range. In another implementation, the narrow band reflector is a holographic film. A holographic film is made by changing the refractive index of a material in proportion to the intensity of the holographic interference pattern used to expose the holographic film. The holographic interference pattern is designed in such a way as to produce a total specular reflection for light with wavelengths within the narrow range of IR wavelengths, while being essentially transparent to visible light. In this example, the emitters in the optical touch-sensitive device are narrow band LEDs, or lasers having wavelengths compatible with the holographic film properties.

C. Frame

The optical touch-sensitive device may include a frame for indicating certain attributes of the device, such as clearly demarcating the border of the display and/or separation between zones of the display. Such a frame may be attached to the top or bottom surface of the waveguide. Generally, the frame is opaque to visible light, and may be created using an ink layer (e.g., an IR ink layer and/or a dark ink layer), another material such as a colored layer (e.g., a sticker, a pigmented thin film, etc.), and/or using a coupler that itself is opaque to visible light. The following description describes an ink implementation of a frame, however other materials are expected to be constructed and function similarly. The IR ink is a semi-transparent ink that is transparent in at least part of the near IR wavelength range, for example from 800 nm to 980 nm, while absorbing or reflecting light outside that range including, for example, generally all visible light. Thus, when viewed by a user, the IR ink appears opaque. The dark ink is generally opaque to both visible light as well as the IR light used to detect touch events. Despite generally blocking all visible light, either type of ink layer may have a uniform visible color (e.g., black, white, red, blue, green, etc.), or a varying color pattern. The dark ink layer is not necessarily fully opaque, and may include ink layers of any possible color. As described above, the intermediate layer is typically transparent to visible light, however this is not required.

Figure 11A:
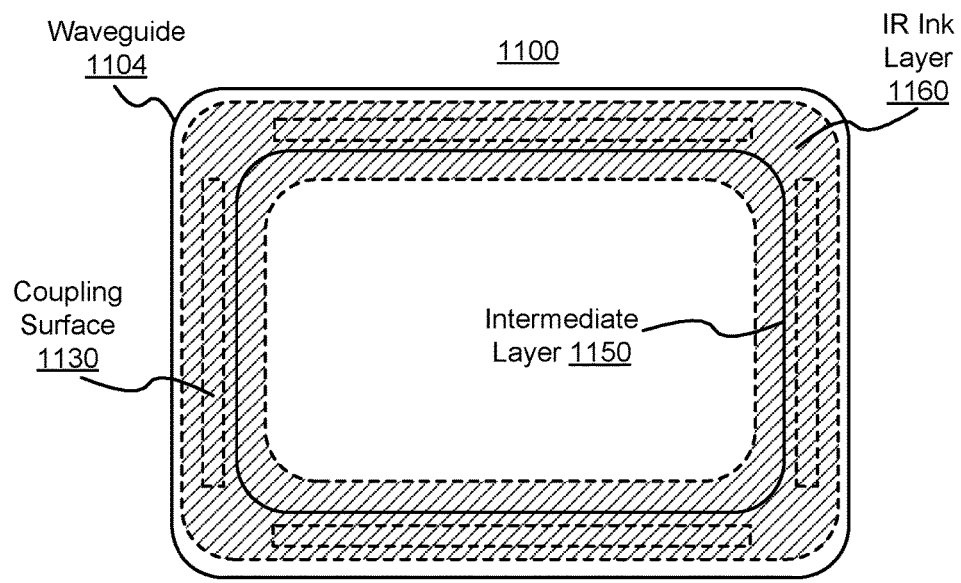
FIG. 11A is a top view of an optical touch-sensitive device with a frame using an infrared (IR) ink layer.
Figure 11B:
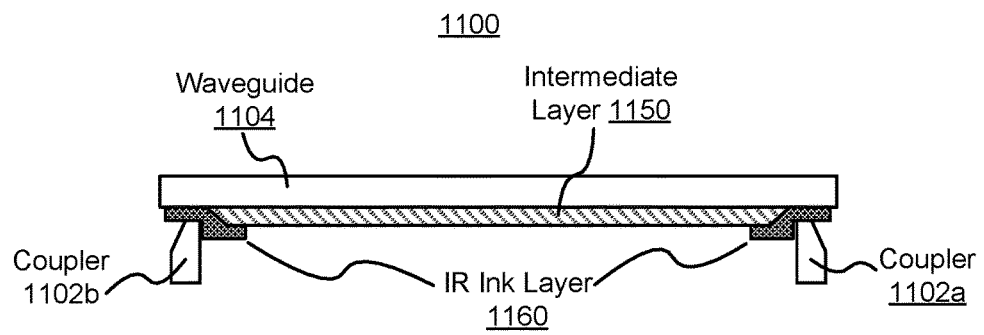
FIG. 11B is a side view of an optical touch-sensitive device with a frame using an IR ink layer.

In one embodiment, a bottom frame is constructed by interposing an intermediate layer between the bottom surface of the waveguide and an IR ink layer. FIG. 11A is a top view of an optical touch-sensitive device 1100 with a bottom frame using an IR ink layer, and FIG. 11B is a side view of the same device 1100. In this example, the optical beams propagating in the waveguide are assumed to have near IR wavelengths. An intermediate layer 1150 is applied to the central portion of the waveguide bottom surface. An IR ink layer 1160 is applied to the border of the waveguide bottom surface.

In one embodiment, the IR ink layer 1160 extends from the waveguide edge and abuts the intermediate layer 1150 (not shown). In another embodiment as shown in FIGS. 11A-11B, the IR ink layer 1160 extends from the waveguide edge past the boundary of the intermediate layer 1150, and thus overlaps part of the intermediate layer 1150. In the example embodiment of FIGS. 11A and 11B, couplers 1102 are optically coupled to the waveguide at the coupling surface 1130 through the IR ink layer 1160. This forms a part of the exterior portion of the frame not overlapping with the intermediate layer 1150. As a result, light is injected/extracted with limited attenuation from the IR ink layer and without any influence from the intermediate layer. The interior portion of the frame overlapping the intermediate layer does not affect light propagation inside the waveguide because the intermediate layer blocks light from interacting with the overlapping IR ink layer. The interior and exterior portions of the frame may also be referred to as different frame zones. In the example of FIG. 11, the frame as a whole includes both the interior and exterior portions. In this example, the distinction is merely for convenience, as the interior and exterior portions are merely different portions of the same IR ink layer 1160. However, this is useful in the below-described embodiments where the frame includes more than one material. Other frame zones may also be created beyond interior and exterior, for example as described further below with respect to dead zones and fixed graphics.

Attaching a bottom frame to the waveguide maintains the flush aspect of the waveguide top surface which functions as the touch screen. The flush nature of the touch screen improves user interaction comfort in that users can move their fingers all over the touch screen without perceiving any level change. This is usually accomplished by leaving the waveguide top surface essentially unmodified, with the possible exception of applied anti-glare coatings, anti-fingerprint coatings, hardenings, etc.

Figure 12A:
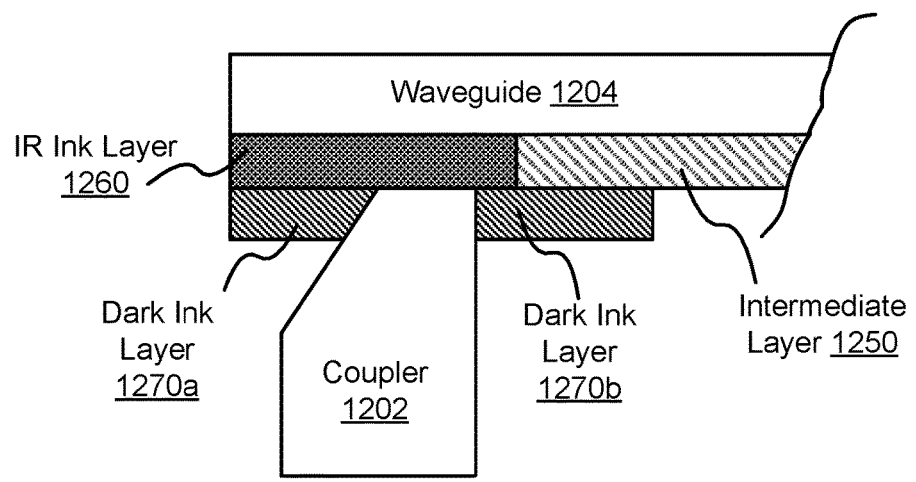
FIGS. 12A-12C are side views of an optical touch-sensitive device illustrating a frame made with an IR ink layer and a dark ink layer.
Figure 12B:
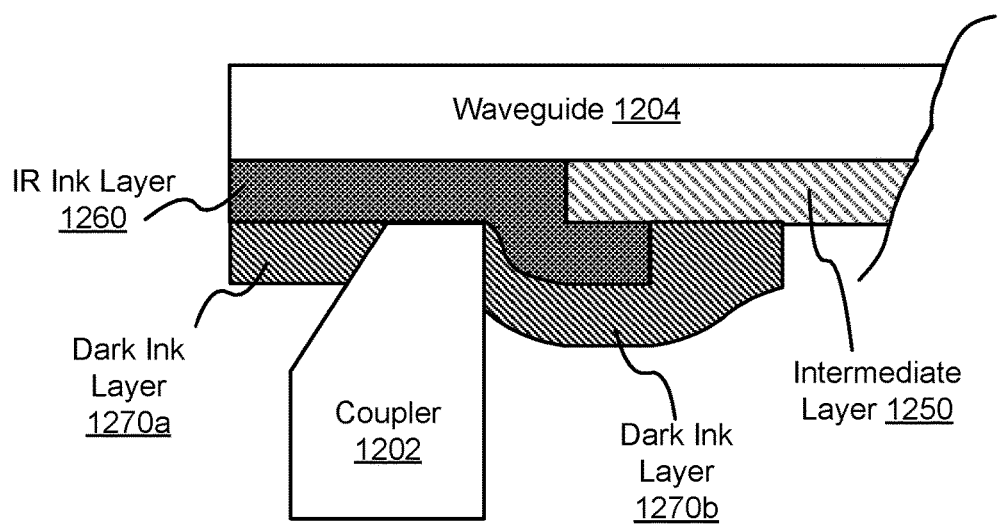
Figure 12C:
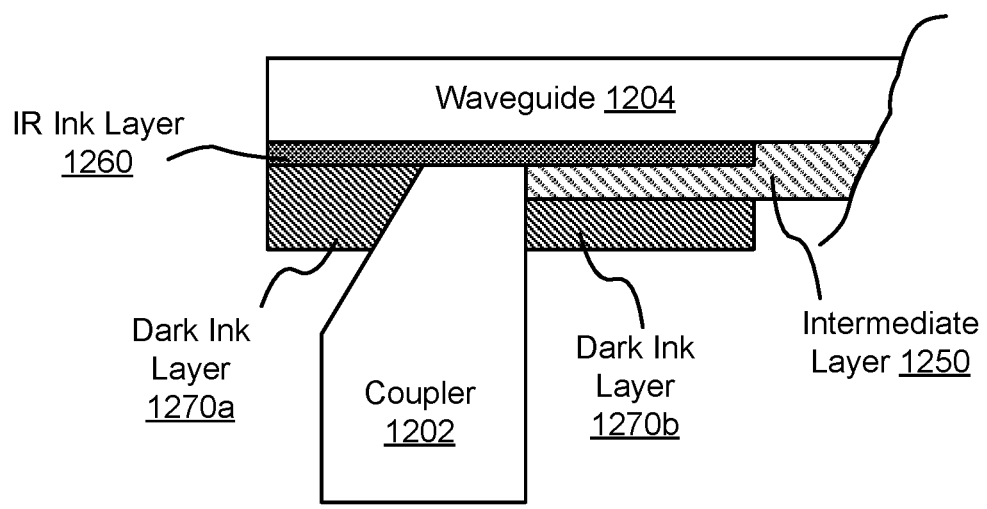

FIGS. 12A-12C are side views of an optical touch-sensitive device illustrating a frame made with an IR ink layer and a dark ink layer. In FIG. 12A, the IR ink layer 1260 extends from the edge of the waveguide and abuts the intermediate layer 1250 without any overlap. The coupler 1202 is attached to the exterior frame zone. A layer of dark ink 1270 covers the remaining bottom surface of the IR ink layer 1260 that is not covered by the coupler 1202. The dark ink layer 1270 also overlaps a portion of the intermediate layer 1250 to create the interior frame zone. The dark ink layer is advantageous because it more fully blocks light relative to the IR ink layer. The dark ink layer does not interact with optical beams propagating in the waveguide, since it is either outside the optical beam propagation path (e.g., the dark ink layer 1270*a*) or shielded from the optical beams by the intermediate layer (e.g., the dark ink layer 1270*b*).

FIG. 12B shows another embodiment where the IR ink layer 1260 extends to overlap with the intermediate layer 1250. The coupler 1202 is attached to the exterior frame zone. The dark ink layer 1270 is applied to cover the remaining bottom surface of the IR ink layer 1260 that is not covered by the coupler 1202, including the interior frame zone where the IR ink layer overlaps with the intermediate layer. The dark ink layer 1270 may also extend to overlap with the intermediate layer 1250 as illustrated.

FIG. 12C shows another embodiment where an edge portion of the intermediate layer 1250 is interposed between the IR ink layer 1260 and the dark ink layer 1270*b*. The coupler 1202 is attached to the exterior frame zone. The dark ink layer 1270*a* is applied to cover the remaining bottom surface of the IR ink layer 1260 that is not covered by the coupler 1202. In the example shown in FIG. 12C, the dark ink layer 1270*b* abuts the coupler 1202, extending inwards to cover exactly the same area as the IR ink layer 1260. In other cases, the dark ink layer may cover different areas from the IR ink layer.

Figure 13:
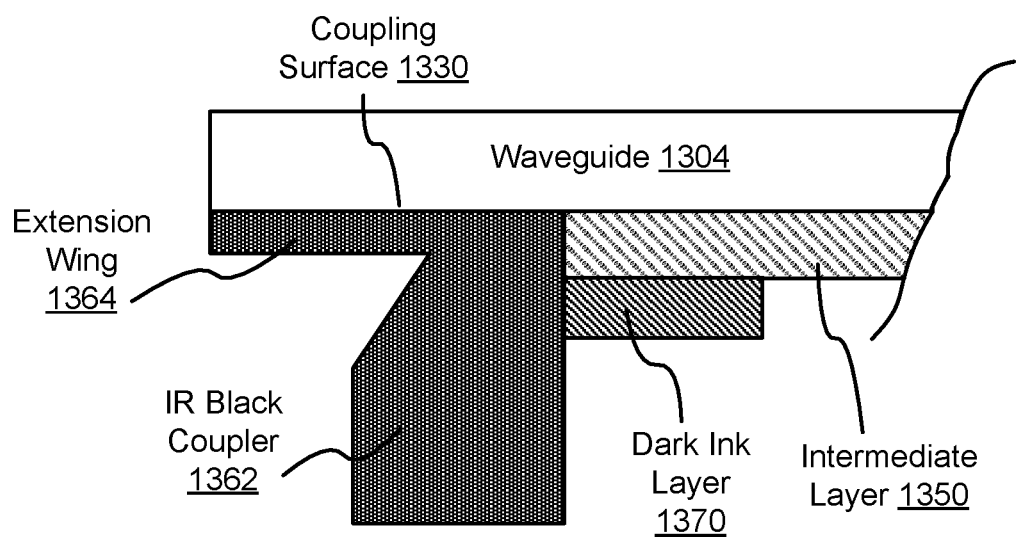
FIG. 13 is a side view of an optical touch-sensitive device illustrating a frame made with an IR black optical coupler and a dark ink layer.

FIG. 13 is a side view of an optical touch-sensitive device illustrating a frame made with an IR black optical coupler and a dark ink layer. In this embodiment, the IR black coupler 1362 is made of poly(methyl methacrylate) (PMMA), or a similar material such as polycarbonate (PC). Such materials are transparent to IR light but absorb visible light.

In FIG. 13, the IR black coupler 1362 is shown to include an extension wing 1364 that extends to the outer edge of the bottom surface of the waveguide 1304. The extension wing 1364 extends the coupling surface 1330, acting as the exterior frame zone. In addition to or as an alternative to the extension wing 1364, an IR ink layer may be used (not shown). In one implementation, the IR black coupler 1362 is attached to the waveguide using an adhesive such as OCA (not shown). FIG. 13 also shows that the central part of the waveguide 1304 is covered with an intermediate layer 1350 that abuts the IR black coupler 1362. The dark ink layer 1370 extends from the IR black coupler 1362 inwards towards the display module, overlapping the intermediate layer 1350 and acting as the interior frame zone. The coupler 1362 may include a second extension wing (not shown) extending inwards towards the display module, which may be used in place of the dark ink layer 1370 or to act as a dark background for a partially transparent IR ink layer (not shown).

D. Dead Zones

It is also possible to attach a frame to the top surface of the waveguide. In one embodiment, such a top frame is constructed by interposing an intermediate layer between the top surface of the waveguide and an ink layer. More generally, a top frame may be created using the same materials as a bottom frame. While this construction does not necessarily have a perfectly flush top surface, a sufficiently thin top frame can be constructed such that the height differential between the top frame and the top surface of the waveguide is not easily perceived by the user. This is referred to as a near-flush design. For top frames, the intermediate layer is also referred to as a cover layer, which may be a low-RI layer or a mirror layer. Top frames cause the waveguide to be insensitive to touch across their entire extent, and the top-frame covered zones are referred to as dead zones.

Figure 14:
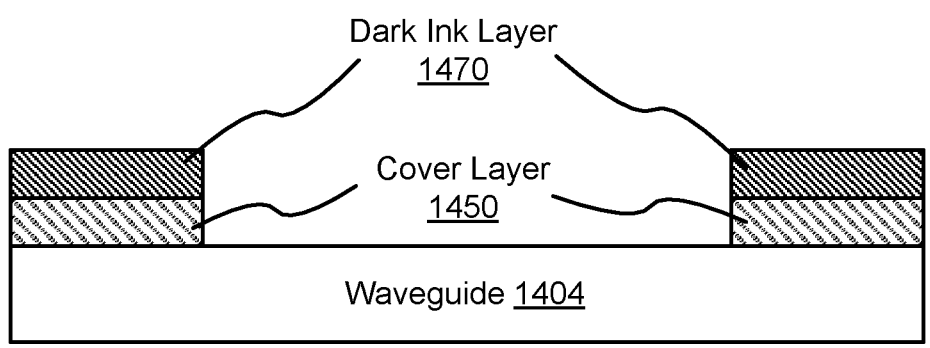
FIG. 14 is a side view of an optical touch-sensitive device illustrating dead zones.

FIG. 14 is a side view of an optical touch-sensitive device illustrating dead zones. In this example, a cover layer 1450 is applied on the periphery of the top surface of the waveguide 1404. A dark ink layer 1470 is then applied on top of the cover layer 1450 to make the dead zones visible to the user. Since light reflection (either TIR or specular reflection) occurs at the interface between the waveguide 1404 and the cover layer 1450, the dark ink layer 1470 does not interact with light propagating in the waveguide. As shown in FIG. 14, the cover layer 1450 does not cover the central part of the touch screen that is used to sense finger presence, although this is not required. Similar dead zones may be created along any portion of the display. The visible zone separations are not sensitive to touches, and can be used to, for example, produce a dual display from a single display. In other implementations, the dark ink layer 1470 may be omitted, in which case the dead zones are invisible to the user. In some embodiments, a protective layer is applied on top of the frame. The protective layer may be transparent or opaque to visible light.

E. Fixed Graphics Zones

In one embodiment, the optical touch-sensitive device includes one or more touch-sensitive fixed graphics zones, which are attached below the bottom surface of the waveguide. Each fixed graphics zone includes one or more fixed graphics and one or more associated software buttons. These software buttons typically perform one or more pre-defined software functions with respect to the optical touch-sensitive device in response to detection of one or more touches in the vicinity of the fixed graphic zone.

Figure 15A:
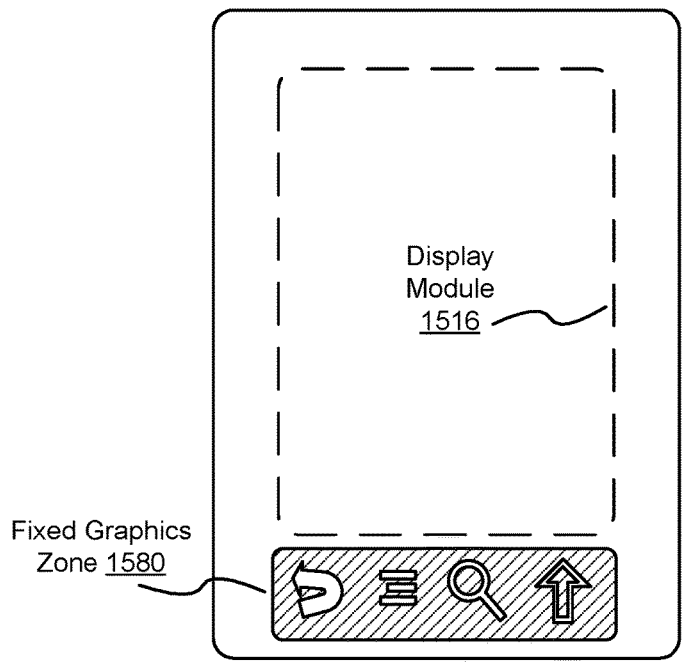
FIG. 15A is a top view of an optical touch-sensitive device illustrating a fixed graphics zone.

FIG. 15A is a top view of an optical touch-sensitive device illustrating a fixed graphics zone. In FIG. 15A, the display module 1516 occupies most of the central portion of the touch sensitive active area, and the fixed graphics zone 1580 is located away from the display module 1516. In this example, the fixed graphics zone 1580 includes four graphics, each associated with a different software button. For example, fixed graphics zone 1580 illustrates, from left to right, "back", "menu", "search", and "home", graphics. This example only shows one fixed graphics zone with four associated fixed buttons, each button corresponding to a different portion of the fixed graphics zone. In other implementations, the optical touch-sensitive device includes multiple fixed graphics zones, each zone having one or more fixed buttons.

Figure 15B:
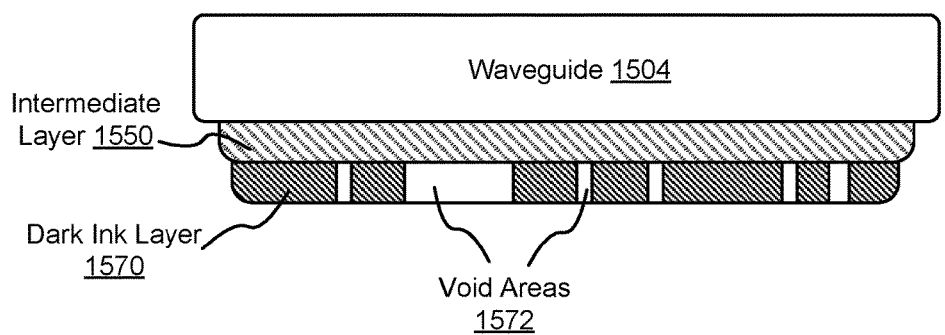
FIG. 15B is a side view of an optical touch-sensitive device illustrating a fixed graphics zone.

FIG. 15B is a side view of an optical touch-sensitive device illustrating a fixed graphics zone. The fixed graphics zone includes a dark ink layer 1570 and an intermediate layer 1550. The intermediate layer 1550 is interposed between the dark ink layer 1570 and the bottom surface of the waveguide. The intermediate layer 1550 prevents light interaction with the dark ink layer 1570, and preserves light propagation in the waveguide 1504 via TIR or specular reflection. The intermediate layer is transparent to visible light, so that the portions of the fixed graphics zone 1580 covered by the dark ink layer 1570 can be viewed through the top surface of the waveguide. To produce the desired fixed graphics, the dark ink layer 1570 is patterned as designed from a top down perspective. The dark ink layer 1570 may have void areas 1572 (i.e., ink-free areas) corresponding to the fixed graphics. This partially inked layer may be produced, for example, by using a stencil that masks dark ink at desired locations. In other cases, the void areas may instead be filled with a contrast material that appears differently than the dark ink to the user.

In an alternative embodiment, the fixed graphics zones are attached on the top surface of the waveguide as appropriately sized/shaped dead zones (as illustrated in the previous section) while still maintaining touch sensitivity in the void areas.

F. Logo Zones

In some implementations, the optical touch-sensitive device includes one or more logo zones, which are attached below the bottom surface of the waveguide. Each logo zone includes one or more logos, which are protected from wear and damage by virtue of being placed on the waveguide's bottom surface (i.e., away from touch interactions). Since logos are often printed in color (e.g., silver), a reflective ink layer (e.g., a reflective silver ink layer or other reflective materials) can be used which contains the desired logos. The reflective ink layer may be placed in direct contact with the bottom surface of the waveguide, in a location where the intermediate layer is absent, in place of at least a portion of the intermediate layer, or between the intermediate layer and the waveguide. If the reflective ink layer is directly in contact with the waveguide, the reflective ink layer does not materially affect optical beam propagation in the waveguide. For example, the logos may be placed in the touch sensitive area or in the exterior frame zone. Other layers of material (e.g., an IR ink layer, a dark ink layer, etc.) may be applied to cover or surround the logos. The logos may be produced in a similar way as the fixed graphics described above.

In one approach, a reflective ink layer containing the desired logos is attached to the bottom surface of the waveguide. An IR ink layer is applied to the bottom surface of the reflective ink layer including the logos. A dark ink layer is then applied to the bottom surface of the IR ink layer. In another approach, an IR ink layer is first applied to the bottom surface of the waveguide. The IR ink layer includes clear areas for the logos. A reflective ink layer containing the desired logos is applied to the bottom surface of the waveguide in the clear areas of the IR ink layer. A dark ink layer is then applied to the bottom surfaces of the IR ink layer and the reflective ink layer including the logos.

G. Manufacturing Processes

Figure 16:
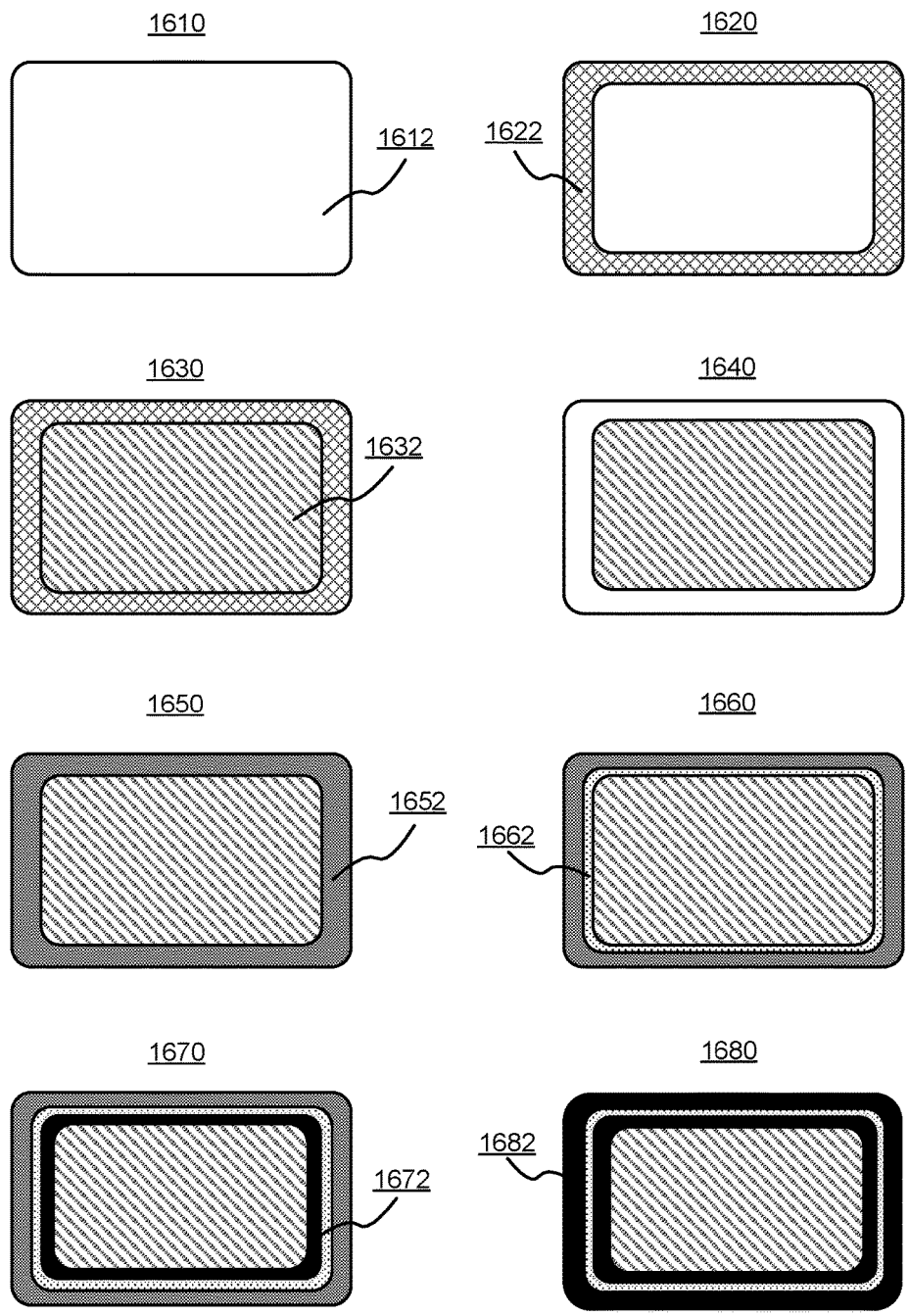
FIG. 16 illustrates the sequence of steps to manufacture an optical touch-sensitive device with a frame using an IR ink layer and a dark ink layer.

FIG. 16 illustrates the sequence of steps to manufacture an optical touch-sensitive device with a frame using an IR ink layer and a dark ink layer. Such a device may correspond to the one shown in FIG. 12A. There are many possible process flows to manufacture such a device, and FIG. 16 is only shown as an example.

At step 1610, the device is shown as a bare waveguide that in this example embodiment is made of glass 1612. At step 1620, a masking layer 1622 is applied to the border of the waveguide, preferably on its bottom surface. At step 1630, an intermediate layer 1632 (e.g., a low-RI layer with a thickness of 10-50 microns) is applied to the bottom surface of the waveguide. The intermediate layer is shown to cover the central part of the waveguide, and also possibly overlaps with some portion of the masking layer. The low-RI layer may be applied using dip-coating, spin-coating, spray-coating of liquid or vapor deposition of materials such as $MgF_2$ or fluoropolymer/halogenated materials.

At step 1640, the masking layer is removed to reveal bare glass on the border of the waveguide. At step 1650, an IR ink layer 1652 is applied to the revealed bare glass on the bottom of the waveguide. At step 1660, a coupler assembly 1662 is attached to the IR ink layer along its inner edge. A layer of OCA may be used to facilitate attaching. At step 1670, a layer of dark ink 1672 is applied inboard of the coupler assembly 1662, overlapping the edge portion of the intermediate layer to create an opaque interior frame zone. At step 1680, another layer of dark ink 1682 is applied outboard of the coupler assembly 1662, overlapping the IR ink layer to create an opaque exterior frame zone.

Figure 17:
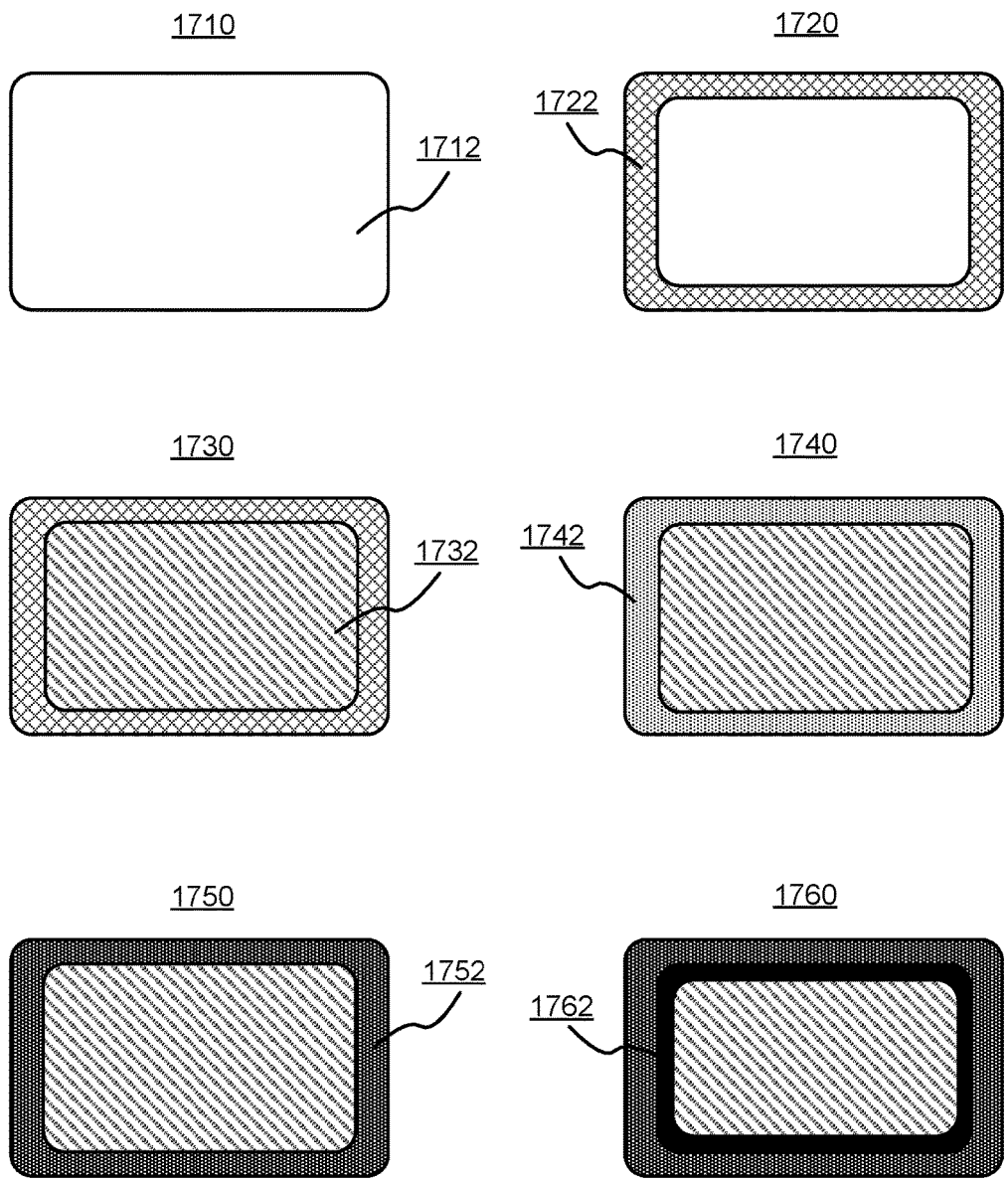
FIG. 17 illustrates the sequence of steps to manufacture an optical touch-sensitive device with a frame using an IR black optical coupler and a dark ink layer.

FIG. 17 illustrates the sequence of steps to manufacture an optical touch-sensitive device with a frame using an IR black optical coupler and a dark ink layer. Such a device may correspond to the one shown in FIG. 13. There are many possible process flows to manufacture such a device, and FIG. 17 is only shown as an example.

At step 1710, the device is shown as a bare waveguide that in this example embodiment is made of glass 1712. At step 1720, an OCA layer together with a liner layer 1722 is applied to the border of the waveguide, preferably on its bottom surface. The liner layer functions as a masking layer for the OCA layer. At step 1730, an intermediate layer 1732 (e.g., a low-RI layer with a thickness of 10-50 microns) is applied to the bottom surface of the waveguide. The intermediate layer covers the central part of the waveguide, and also possibly overlaps with some portion of the liner layer. The low-RI layer may be applied using dip-coating, spin-coating, spray-coating of liquid or vapor deposition of materials such as $MgF_2$ or fluoropolymer/halogenated materials.

At step 1740, the liner layer is removed to reveal the OCA layer 1742 on the border of the waveguide. At step 1750, an IR black coupler assembly 1752 is attached to the OCA layer. The IR black coupler assembly has extension wings that extend to the edges of the waveguide, creating an exterior frame zone. At step 1760, a layer of dark ink 1762 is applied inboard of the IR black coupler assembly, overlapping the edge portion of the intermediate layer to create an interior frame zone.

V. Applications

The touch-sensitive devices described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

VI. Additional Considerations

The figures depict embodiments of the present invention for purposes of illustration only. One skilled in the art will readily recognize from the following discussion that alternative embodiments of the structures and methods illustrated herein may be employed without departing from the principles of the invention described herein.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An optical touch-sensitive device for use with a display, the touch-sensitive device comprising:
    a planar optical waveguide extending over a surface of the display, the waveguide having a top surface and a bottom surface;
    emitters and detectors arranged along a periphery of the display;
    an optical coupler assembly positioned along the periphery of the display, the optical coupler assembly coupling optical beams produced by the emitters into the waveguide and out of the waveguide to the detectors, wherein touches on the top surface of the waveguide disturb the optical beams, the touch-sensitive device determining touch events based on the disturbances; and
    at least one static dead zone, the static dead zone comprising:
        a cover layer having a top surface and a bottom surface, the bottom surface of the cover layer directly coupled to the top surface of the waveguide, the cover layer preserving optical beam propagation in the waveguide by reflecting optical beams propagating in the waveguide at the cover layer's bottom surface, wherein the cover layer makes the dead zone insensitive to touches; and a dark layer that is opaque to visible light, wherein a bottom surface of the dark layer is coupled to the top surface of the cover layer.

2. The optical touch-sensitive device of claim 1, wherein the cover layer is transparent to visible light.

3. The optical touch-sensitive device of claim 1, wherein the cover layer has a thickness greater than at least a penetration depth of an evanescent light field in the waveguide.

4. The optical touch-sensitive device of claim 1, wherein the cover layer is a low refractive index layer that has a refractive index smaller than the refractive index of the waveguide.

5. The optical touch-sensitive device of claim 4, wherein the thickness of the cover layer is in the range 1 micron to 50 microns.

6. The optical touch-sensitive device of claim 1, wherein the cover layer has one or more gaps.

7. The optical touch-sensitive device of claim 1, wherein the waveguide comprises a single plane of material.

8. The optical touch-sensitive device of claim 1, further comprising at least one fixed graphics zone for displaying fixed graphics, each fixed graphics zone comprising:

an ink layer opaque to visible light, the ink layer comprising the fixed graphics, the optical touch-sensitive device performing pre-defined functions corresponding to touches on the top surface of the waveguide aimed at the fixed graphics; and an additional cover layer interposed between the bottom surface of the waveguide and the ink layer, the additional cover layer of the fixed graphics zone preserving optical beam propagation in the waveguide and transparent to visible light.

9. The optical touch-sensitive device of claim 1, wherein the optical coupler assembly redirects light rays entering into the waveguide from an emitter or exiting from the waveguide and entering a detector.

10. The optical touch-sensitive device of claim 1, further comprising a binding layer physically coupling the optical coupler assembly to the waveguide, the binding layer comprising an optically clear adhesive that is transparent to optical beams propagating in the waveguide.

11. The optical touch-sensitive device of claim 1, wherein the optical beams have infrared wavelengths ranging from 200 nm to 2000 nm.

12. The optical touch-sensitive device of claim 1, further comprising: an intermediate layer interposed between the bottom surface of the waveguide and the surface of the display, the intermediate layer preserving optical beam propagation in the waveguide and being transparent to visible light.

13. The optical touch-sensitive device of claim 12, wherein the optical coupler assembly and the waveguide are optically coupled such that light passes from the optical coupler assembly to the waveguide without interacting with the intermediate layer.

14. The optical touch-sensitive device of claim 13, wherein the intermediate layer has a refractive index smaller than a refractive index of the waveguide, and optical beam propagation in the waveguide is preserved via total internal reflection at the bottom surface of the waveguide.

15. The optical touch-sensitive device of claim 14, further comprising a binding layer physically coupling the intermediate layer to the display, the binding layer transparent to visible light.

16. The optical touch-sensitive device of claim 14, wherein the intermediate layer has a thickness greater than at least a penetration depth of an evanescent light field in the waveguide.

17. The optical touch-sensitive device of claim 14, wherein the intermediate layer comprises a fluoropolymer material.

18. The optical touch-sensitive device of claim 14, wherein the optical coupler assembly and the waveguide are optically coupled such that light passes through the intermediate layer when being coupled from the emitters into waveguide and from the waveguide into the detectors.

19. The optical touch-sensitive device of claim 14, wherein the intermediate layer functions as a binding layer physically coupling the waveguide to the display.

20. The optical touch-sensitive device of claim 12, wherein the intermediate layer is a mirror for the optical beams propagating in the waveguide, and optical beam propagation in the waveguide is preserved via specular reflection at the bottom surface of the waveguide.

21. The optical touch-sensitive device of claim 20, wherein the intermediate layer is a holographic film.

22. The optical touch-sensitive device of claim 20, wherein the intermediate layer is an interference filter.

23. The optical touch-sensitive device of claim 12, wherein the optical coupler assembly is transparent to the optical beams propagating in the waveguide and is opaque to visible light.

24. The optical touch-sensitive device of claim 23, wherein a coupling surface of the optical coupler assembly that couples to the waveguide extends to an edge of the bottom surface of the waveguide.

25. The optical touch-sensitive device of claim 23, further comprising a dark ink layer positioned such that an edge portion of the intermediate layer is interposed between the dark ink layer and the bottom surface of the waveguide, the dark ink layer opaque to visible light.

26. The optical touch-sensitive device of claim 12, further comprising an ink layer interposed between the optical coupler assembly and the waveguide, the ink layer transparent to the optical beams propagating in the waveguide and opaque to visible light.

27. The optical touch-sensitive device of claim 26, wherein the ink layer extends to an edge of the bottom surface of the waveguide.

28. The optical touch-sensitive device of claim 26, wherein the ink layer extends to overlap with an edge portion of the intermediate layer.

29. The optical touch-sensitive device of claim 26, further comprising a dark ink layer positioned such that the ink layer and an edge portion of the intermediate layer are interposed between the dark ink layer and the bottom surface of the waveguide, the dark ink layer opaque to visible light.

30. The optical touch-sensitive device of claim 26, further comprising a dark ink layer positioned such that an edge portion of the intermediate layer is interposed between the ink layer and the dark ink layer and the ink layer is interposed between the bottom surface of the waveguide and the edge portion of the intermediate layer, the dark ink layer opaque to visible light.

31. The optical touch-sensitive device of claim 12, further comprising a dark layer positioned such that a bottom surface of the dark layer is directly coupled to the top surface of the cover layer, the dark layer comprising a dark material opaque to visible light.

32. The optical touch-sensitive device of claim 31, further comprising a protective layer positioned such that a bottom surface of the protective layer is directly coupled to a top surface of the dark layer, the protective layer transparent to visible light.

33. The optical touch-sensitive device of claim 12, further comprising:
   at least one fixed graphics zone for displaying fixed graphics, each fixed graphics zone comprising:
      an ink layer opaque to visible light, the ink layer comprising the fixed graphics, the optical touch-sensitive device performing pre-defined functions corresponding to touches on the top surface of the waveguide aimed at the fixed graphics; and
      an additional intermediate layer interposed between the bottom surface of the waveguide and the ink layer, the additional intermediate layer of the fixed graphics zone preserving optical beam propagation in the waveguide and transparent to visible light.

34. The optical touch-sensitive device of claim 12, further comprising:
   at least one frame zone, each frame zone comprising:
      an ink layer opaque to visible light; and
      an additional intermediate layer interposed between the bottom surface of the waveguide and the ink layer, the additional intermediate layer of the frame zone preserving optical beam propagation in the waveguide and transparent to visible light.

35. The optical touch-sensitive device of claim 12, wherein the optical coupler assembly is a multi-part assembly, a first part of the optical coupler assembly is positioned underneath the bottom surface of the waveguide within and surrounded by the intermediate layer and a second part of the optical coupler assembly is positioned underneath the intermediate layer.

36. The optical touch-sensitive device of claim 35, wherein the optical coupler assembly has a refractive index that is close to or substantially matched with a refractive index of the intermediate layer.

37. The optical touch-sensitive device of claim 1, wherein the cover layer is a low-RI layer.

38. The optical touch-sensitive device of claim 1, wherein the cover layer is applied to the waveguide using a lamination process.

39. The optical touch-sensitive device of claim 1, wherein the cover layer is a mirror layer.

40. The optical touch-sensitive device of claim 1, wherein the at least one static dead zone further comprises:
   a protective layer that is transparent to visible light, wherein a bottom surface of the protective layer is coupled to a top surface of the dark layer.

* * * * *